US010840993B2

(12) United States Patent
Kim et al.

(10) Patent No.: US 10,840,993 B2
(45) Date of Patent: Nov. 17, 2020

(54) METHOD FOR TRANSMITTING AND RECEIVING SIGNAL IN WIRELESS LAN SYSTEM AND APPARATUS FOR SAID METHOD

(71) Applicant: LG ELECTRONICS INC., Seoul (KR)

(72) Inventors: Jinmin Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/606,731

(22) PCT Filed: Dec. 14, 2017

(86) PCT No.: PCT/KR2017/014761

§ 371 (c)(1),
(2) Date: Oct. 18, 2019

(87) PCT Pub. No.: WO2018/194234

PCT Pub. Date: Oct. 25, 2018

(65) Prior Publication Data

US 2020/0059287 A1 Feb. 20, 2020

Related U.S. Application Data

(60) Provisional application No. 62/487,488, filed on Apr. 20, 2017, provisional application No. 62/491,270, filed on Apr. 28, 2017.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04L 5/0007* (2013.01);
(Continued)

(58) Field of Classification Search
CPC ... H04B 7/0617; H04B 7/0695; H04L 5/0007; H04L 5/0023; H04L 27/2614; H04W 84/12
See application file for complete search history.

(56) References Cited

U.S. PATENT DOCUMENTS 10,355,896 B2 * 7/2019 Lomayev ............ H04L 25/0226
2016/0249332 A1 * 8/2016 Xin ....................... H04L 5/0053
(Continued)

FOREIGN PATENT DOCUMENTS

WO 2017014551 1/2017

OTHER PUBLICATIONS

Takenori Sakamoto et al., EDMG A-PPDU for 11ay SC mode, IEEE 802.11-17/0051r3, Jan. 17, 2017, See slide 5 and whole document (Year: 2017).*

(Continued)

*Primary Examiner* — Jenee Holland
(74) *Attorney, Agent, or Firm* — Lee Hong Degerman Kang Waimey

(57) ABSTRACT

Disclosed are a method for a station for transmitting and receiving a signal in a wireless local area network (WLAN) system, and an apparatus for the method. More specifically, disclosed are a method for transmitting and receiving a signal and an apparatus for the method, the method, when a station transmits and receives a signal by means of a channel in which four channels have been bonded, generating an enhanced directional multi gigabit (EDMG) short training field (STF) for an orthogonal frequency division multiplex-
(Continued)

ing (OFDM) packet, and transmitting and receiving a signal comprising the generated EDMG STF field.

13 Claims, 36 Drawing Sheets

(51) Int. Cl.
*H04L 27/26* (2006.01)
*H04W 84/12* (2009.01)

(52) U.S. Cl.
CPC ........ *H04L 5/0023* (2013.01); *H04L 27/2614* (2013.01); *H04W 84/12* (2013.01)

(56) References Cited

U.S. PATENT DOCUMENTS

| | | | | |
|---|---|---|---|---|
| 2016/0323755 | A1* | 11/2016 | Cordeiro | H04W 72/046 |
| 2016/0323861 | A1 | 11/2016 | Cordeiro et al. | |
| 2016/0323878 | A1* | 11/2016 | Ghosh | H04W 72/0446 |
| 2017/0048844 | A1* | 2/2017 | Chen | H04W 72/0413 |
| 2017/0070995 | A1* | 3/2017 | Eitan | H04L 5/001 |
| 2017/0078008 | A1* | 3/2017 | Kasher | H04B 7/0617 |
| 2017/0202011 | A1* | 7/2017 | Trainin | H04W 74/0816 |
| 2017/0302402 | A1* | 10/2017 | Cordeiro | H04L 1/0003 |
| 2017/0324599 | A1* | 11/2017 | Lomayev | H04B 7/0413 |
| 2017/0332277 | A1* | 11/2017 | Xin | H04L 69/22 |
| 2018/0013480 | A1* | 1/2018 | Lomayev | H04L 5/0053 |
| 2018/0019848 | A1* | 1/2018 | Lomayev | H04L 27/2607 |
| 2018/0020374 | A1* | 1/2018 | Kasher | H04L 1/0003 |
| 2018/0026749 | A1* | 1/2018 | Lomayev | H04L 1/0643 375/267 |
| 2018/0062902 | A1* | 3/2018 | Gagiev | H04L 27/2605 |
| 2018/0062903 | A1* | 3/2018 | Kasher | H04L 27/2602 |
| 2018/0063299 | A1* | 3/2018 | Genossar | H04L 12/2863 |
| 2018/0076979 | A1* | 3/2018 | Lomayev | H04L 27/2601 |
| 2018/0092092 | A1* | 3/2018 | Cariou | H04L 5/0046 |
| 2018/0102927 | A1* | 4/2018 | Sanderovich | H04L 25/0204 |
| 2018/0191419 | A1* | 7/2018 | Eitan | H04W 16/28 |
| 2018/0248600 | A1* | 8/2018 | Kasher | H04B 7/0491 |
| 2019/0068258 | A1* | 2/2019 | Oteri | H04B 7/0617 |
| 2019/0097854 | A1* | 3/2019 | Park | H04L 5/0048 |
| 2019/0140730 | A1* | 5/2019 | Oteri | H04B 7/0452 |
| 2019/0158321 | A1* | 5/2019 | Liu | H04W 8/08 |
| 2019/0190637 | A1* | 6/2019 | Lomayev | H04L 23/02 |
| 2019/0199499 | A1* | 6/2019 | Da Silva | H04L 27/2602 |
| 2019/0260446 | A1* | 8/2019 | Oteri | H04B 7/0695 |
| 2019/0260621 | A1* | 8/2019 | Liu | H04L 5/0007 |

OTHER PUBLICATIONS

Rob Sun et al., EDMG Capability and Operation Element Channel Indication, Mar. 16, 2017, See pp. 3-4 and whole document (Year: 2017).*

Artyom Lomayev et al., EDMG STF and CEF Design for SC PHY in 11ay, IEEE 802.11-16/0994r1, Jul. 27, 2016, See slides 2-6 and whole document (Year: 2016).*

Alecsander Eitan, Packet structure for SC EDMG PPDU for each GI length, IEEE 802.11-16/1394-01-00, Nov. 7, 2016, See slides 10-12 and whole document (Year: 2016).*

PCT International Application No. PCT/KR2017/014761, International Search Report dated Mar. 21, 2018, 4 pages.

European Patent Office Application Serial No. 17906566.9, Search Report dated Apr. 8, 2020, 11 pages.

IEEE: "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45 GHz," IEEE P802.11ay/D0.1, Jan. 2017, 181 pages.

IEEE Computer Society, "IEEE Standard for Low-Rate Wireless Personal Area Networks (WPANs)," IEEE Std 802.15.4-2015, Dec. 2015, 709 pages.

Abu-Surra, S. et al., Length 1344 LDPC codes for 11ay, doc.: IEEE 802.11-16/0676r1, May 2016, 32 pages.

IEEE: "Information technology—Telecommunications and information exchange between systems—Local and metropolitan area networks—Specific requirements—Part 11: Wireless LAN medium access control (MAC) and physical layer (PHY) specifications—Amendment 3: Enhancements for very high throughput in the 60 GHz band (adoption of IEEE Std 802.11ad-2012)," ISO/IEC/IEEE 8802-11:2012/Amd.3:2014, Dec. 2012, 634 pages.

Coffey, S. et al., "Joint Proposal: High throughput extension to the 802.11 Standard: PHY," doc.: IEEE 802.11-05/1102r2, Nov. 2005, 30 pages.

* cited by examiner (L: Legacy, GF: Gap filling, ay: 802.11ay)

FIG. 12

The sequence $Ga_{128}(n)$

| The Sequence $Ga_{128}(n)$, to be transmitted from left to right, up to down |
|---|
| +1 +1 -1 -1 -1 -1 -1 -1 -1 +1 -1 +1 +1 -1 -1 +1 +1 +1 -1 -1 +1 +1 +1 +1 -1 +1 -1 +1 -1 +1 +1 -1 |
| -1 -1 +1 +1 +1 +1 +1 +1 +1 -1 +1 -1 -1 +1 +1 -1 +1 +1 -1 -1 +1 +1 +1 +1 -1 +1 -1 +1 -1 +1 +1 -1 |
| +1 +1 -1 -1 -1 -1 -1 -1 -1 +1 -1 +1 -1 -1 -1 +1 +1 +1 -1 -1 +1 +1 +1 +1 -1 +1 -1 +1 -1 +1 +1 -1 |
| +1 +1 -1 -1 -1 -1 -1 -1 -1 +1 -1 +1 +1 -1 -1 +1 -1 -1 +1 +1 -1 -1 -1 -1 +1 -1 +1 -1 +1 -1 -1 +1 |

FIG. 13

The sequence $Gb_{128}(n)$

| The Sequence $Gb_{128}$ (n), to be transmitted from left to right, up to down |
|---|
| -1 -1 +1 +1 +1 +1 +1 +1 +1 -1 +1 -1 -1 +1 +1 -1 -1 -1 +1 +1 -1 -1 -1 -1 +1 -1 +1 -1 +1 -1 -1 +1 |
| +1 +1 -1 -1 -1 -1 -1 -1 -1 +1 -1 +1 +1 -1 -1 +1 -1 -1 +1 +1 -1 -1 -1 -1 +1 -1 +1 -1 +1 -1 -1 +1 |
| +1 +1 -1 -1 -1 -1 -1 -1 -1 +1 -1 +1 +1 -1 -1 +1 +1 +1 -1 -1 +1 +1 +1 +1 -1 +1 -1 +1 -1 +1 +1 -1 |
| +1 +1 -1 -1 -1 -1 -1 -1 -1 +1 -1 +1 +1 -1 -1 +1 -1 -1 +1 +1 -1 -1 -1 -1 +1 -1 +1 -1 +1 -1 -1 +1 |

FIG. 14

The sequence $Ga_{64}(n)$

| The Sequence $Ga_{64}(n)$, to be transmitted from left to right, up to down |
|---|
| -1 -1 +1 -1 +1 -1 -1 -1 +1 +1 -1 +1 +1 -1 -1 -1 -1 -1 +1 -1 +1 -1 -1 -1 -1 -1 +1 -1 -1 +1 +1 +1 |
| -1 -1 +1 -1 +1 -1 -1 -1 +1 +1 -1 +1 +1 -1 -1 -1 +1 +1 -1 +1 +1 +1 +1 +1 +1 +1 -1 +1 +1 -1 -1 -1 |

FIG. 15

The sequence $Gb_{64}$ (n)

| The Sequence $Gb_{64}$ (n), to be transmitted from left to right, up to down |
|---|
| +1 +1 -1 +1 -1 +1 +1 +1 -1 -1 +1 -1 -1 +1 +1 +1 +1 +1 -1 +1 -1 +1 +1 +1 +1 +1 -1 +1 +1 -1 -1 -1<br>-1 -1 +1 -1 +1 -1 -1 -1 +1 +1 -1 +1 +1 -1 -1 -1 +1 +1 -1 +1 -1 +1 +1 +1 +1 +1 -1 +1 +1 -1 -1 -1 |

FIG. 16

The sequence $Ga_{32}(n)$

| The Sequence $Ga_{32}(n)$, to be transmitted from left to right, up to down |
| --- |
| +1 +1 +1 +1 +1 -1 +1 -1 -1 -1 +1 +1 +1 -1 -1 +1 +1 +1 -1 -1 +1 -1 -1 +1 -1 -1 -1 -1 +1 -1 +1 -1 |

FIG. 17

The sequence $Gb_{32}$ (n)

| The Sequence $Gb_{32}$ (n), to be transmitted from left to right, up to down |
|---|
| -1 -1 -1 -1 -1 +1 -1 +1 +1 +1 +1 -1 -1 +1 +1 -1 +1 +1 -1 -1 -1 -1 -1 +1 -1 -1 -1 -1 +1 -1 +1 -1 |

FIG. 19

The Sequence $EDMGS^{1}_{left,800}(n)$, to be transmitted from left to right, up to down 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j
0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0
0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1
0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0
+j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j
0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +j 0 0
0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0
0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0
+1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j
0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0
0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -
1 0 0 0 -j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j
0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1
0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0
0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0

The Sequence $EDMGS^{1}_{right,800}(n)$, to be transmitted from left to right, up to down 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0
-j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j
0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0
0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0
0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1
0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0
0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0
0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0
-1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1
0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0
0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -
j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0
0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0
+1 0 0 0 -1 0 0 0 +j 0 0 0 -1 0 0 0 +1 0 0 0 +j 0 0 0 -1 0 0 0 +j 0 0 0 +j 0 0 0 +1 0 0 0 -1 0 0 0 +1 0 0 0 +j 0 0 0
+1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -
1 0

FIG. 20

The Sequence $EDMGS^{2}_{left,800}(n)$, to be transmitted from left to right, up to down 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0
+j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0
0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0
+1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j
0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0
+j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -j 0
0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0
-1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0
+1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j
0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1
0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0
0 -1 0 0 0 -j 0 0 0 +1 0 0 0 -j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -
j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0
0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0
0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0

The Sequence $EDMGS^{2}_{right,800}(n)$, to be transmitted from left to right, up to down 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0
0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j
0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0
0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1
0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0
0 -1 0 0 0 -j 0 0 0 +1 0 0 0 -j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -
j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0
0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -
1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +1
0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0
0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j
0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +j 0 0
0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0
0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0
+1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0

FIG. 21

| The Sequence $EDMGS^{3}_{left,800}(n)$, to be transmitted from left to right, up to down |
| --- |
| 0 +1 0 0 0 +1 0 0 0 -j 0 0 0 +j 0 0 0 -j 0 0 0 +1 0 0 0 -j 0 0 0 -j 0 0 0 +1 0 0 0 -j 0 0 0 -1 0 0 0 -1 0 0 0 +j 0 0 0 -<br>j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j 0<br>0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0<br>+1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j<br>0 0 0 +j 0 0 0 +1 0 0 0 -j 0 0 0 -j 0 0 0 +1 0 0 0 +j 0 0 0 -1 0 0 0 +1 0 0 0 -j 0 0 0 +j 0 0 0 -j 0 0 0 +1 0 0 0 -j 0 0<br>0 -j 0 0 0 +1 0 0 0 +j 0 0 0 +1 0 0 0 +1 0 0 0 -j 0 0 0 +j 0 0 0 -j 0 0 0 -1 0 0 0 -j 0 0 0 +j 0 0 0 -1 0 0 0 -j 0 0 0 -j<br>0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0<br>0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1<br>0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 -j 0 0 0 -1 0 0 0 +j 0<br>0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0<br>0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0<br>0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0<br>-j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1<br>0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0<br>0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 |
| The Sequence $EDMGS^{3}_{right,800}(n)$, to be transmitted from left to right, up to down |
| 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0<br>-j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0<br>0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0<br>-j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1<br>0 0 0 +1 0 0 0 -j 0 0 0 -1 0 0 0 -1 0 0 0 -j 0 0 0 +1 0 0 0 -j 0 0 0 +j 0 0 0 +1 0 0 0 -1 0 0 0 -1 0 0 0 +j 0 0 0 +1 0<br>0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0<br>0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -<br>1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1<br>0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0<br>0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0<br>-j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0<br>0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0<br>+j 0 0 0 +j 0 0 0 +1 0 0 0 -1 0 0 0 +1 0 0 0 -j 0 0 0 +1 0 0 0 +1 0 0 0 +j 0 0 0 -1 0 0 0 -j 0 0 0 -j 0 0 0 -1 0 0 0<br>+1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1<br>0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 |

FIG. 22

The Sequence $EDMGS^{4}_{left,800}(n)$, to be transmitted from left to right, up to down 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0
+j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0
0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0
-1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j
0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0
0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0
+j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0
+1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1
0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0
0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0
-1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0
+1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0
+1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -
1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j
0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0
0 0 -1 0 0

The Sequence $EDMGS^{4}_{right,800}(n)$, to be transmitted from left to right, up to down 0 0 -1 0 0 0 -1 0 0 0 +j 0 0 0 -j 0 0 0 +j 0 0 0 -1 0 0 0 +j 0 0 0 -j 0 0 0 -1 0 0 0 -j 0 0 0 +1 0 0 0 +1 0 0 0 -j 0 0 0
+j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0
0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0
+j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0
+1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0
+1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0
+1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -
1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0
+j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j
0 0 0 +1 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0
0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -
1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0
0 0 +j 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0
+1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j
0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0
0 0 -1 0

FIG. 23

| |
|---|
| The Sequence $EDMGS^{5}_{left,800}(n)$, to be transmitted from left to right, up to down |
| 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j<br>0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0<br>+1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j<br>0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0<br>0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -j<br>0 0 0 -j 0 0 0 -1 0 0 0 +1 0 0 0 -1 0 0 0 +j 0 0 0 +1 0 0 0 −1 0 0 0 +j 0 0 0 -1 0 0 0 -j 0 0 0 -j 0 0 0 -1 0 0 0 +1 0<br>0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0<br>+1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0<br>+j 0 0 0 +j 0 0 0 −1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1<br>0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1<br>0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0<br>0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0<br>+1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1<br>0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1<br>0 0 |
| The Sequence $EDMGS^{5}_{right,800}(n)$, to be transmitted from left to right, up to down |
| 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0<br>0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0<br>-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1<br>0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0<br>0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 −1 0 0 0 -j<br>0 0 0 -j 0 0 0 -1 0 0 0 +1 0 0 0 -1 0 0 0 +j 0 0 0 +1 0 0 0 −1 0 0 0 +j 0 0 0 -1 0 0 0 -j 0 0 0 -j 0 0 0 -1 0 0 0 +1 0<br>0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0<br>-1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +1<br>0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0<br>0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j<br>0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +j 0<br>0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0<br>0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0<br>+1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 |

FIG. 24

The Sequence $EDMGS^{6}_{left,800}(n)$, to be transmitted from left to right, up to down 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j
0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0
0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1
0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0
0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0
+j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +j 0
0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0
0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0
+1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0
-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1
0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0
0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j
0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0
0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0
0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0

The Sequence $EDMGS^{6}_{right,800}(n)$, to be transmitted from left to right, up to down 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0
-j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0
0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0
+j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1
0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1
0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0
0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0
-1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -
1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0
0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0
-j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0
0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0
-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1
0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0
0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0

FIG. 25

| The Sequence $EDMGS^{7}_{left,800}(n)$, to be transmitted from left to right, up to down |
| --- |
| 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0<br>0 0 -j 0 0 0 +1 0 0 0 +j 0 0 0 +1 0 0 0 -1 0 0 0 +j 0 0 0 -j 0 0 0 +j 0 0 0 -1 0 0 0 +j 0 0 0 +j 0 0 0 -1 0 0 0 -j 0 0 0<br>-1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j<br>0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0<br>0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +j<br>0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0<br>0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -<br>1 0 0 0 -j 0 0 0 +1 0 0 0 +j 0 0 0 +j 0 0 0 +1 0 0 0 -1 0 0 0 +1 0 0 0 +j 0 0 0 -1 0 0 0 +1 0 0 0 +j 0 0 0 -1 0 0 0 -j<br>0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0<br>0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0<br>0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0<br>+j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1<br>0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0<br>0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 |
| The Sequence $EDMGS^{7}_{right,800}(n)$, to be transmitted from left to right, up to down |
| 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j<br>0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0<br>0 +j 0 0 0 +j 0 0 0 +1 0 0 0 -1 0 0 0 -1 0 0 0 -j 0 0 0 -1 0 0 0 -1 0 0 0 -j 0 0 0 +1 0 0 0 -j 0 0 0 -j 0 0 0 -1 0 0 0<br>+1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1<br>0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0<br>0 +j 0 0 0 +j 0 0 0 +1 0 0 0 -1 0 0 0 -1 0 0 0 -j 0 0 0 -1 0 0 0 -1 0 0 0 -j 0 0 0 +1 0 0 0 -j 0 0 0 -j 0 0 0 -1 0 0 0<br>+1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1<br>0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0<br>0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j<br>0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0<br>0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0<br>-1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -<br>1 0 0 0 -1 0 0 0 -j 0 0 0 +1 0 0 0 +j 0 0 0 +j 0 0 0 +1 0 0 0 -1 0 0 0 +1 0 0 0 -j 0 0 0 +1 0 0 0 +1 0 0 0 +j 0 0 0 -<br>1 0 |

FIG. 26

The Sequence $EDMGS^{8}_{left,800}(n)$, to be transmitted from left to right, up to down 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j
0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0
0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0
+1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0
0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0
-j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -j 0
0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0
0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0
0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0
0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0
+1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1
0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0
0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0
-1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -
1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -
1 0 0

The Sequence $EDMGS^{8}_{right,800}(n)$, to be transmitted from left to right, up to down 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0
-j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0
0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0
-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1
0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 +1 0
0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0
-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1
0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 +1 0
0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0
+1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0
0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0
+j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +j
0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0
0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -
1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0

FIG. 27

| The Sequence $EDMGS^{1}_{left,804}(n)$, to be transmitted from left to right, up to down |
|---|
| 0 0 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0<br>0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j<br>0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -<br>1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0<br>-j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0<br>0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +j 0 0 0 +j 0<br>0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0<br>0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0<br>-j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0<br>0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0<br>0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0<br>-1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1<br>0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0<br>0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -<br>1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 |

| The Sequence $EDMGS^{2}_{left,804}(n)$, to be transmitted from left to right, up to down |
|---|
| 0 0 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0<br>0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j<br>0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0<br>-1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0<br>0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j<br>0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -j 0 0 0 -j<br>0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0<br>-j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j<br>0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0<br>-1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j<br>0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0<br>-1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0<br>0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0<br>-1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1<br>0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 |

FIG. 28

The Sequence $EDMGS^{3}_{left,804}(n)$, to be transmitted from left to right, up to down 0 0 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0
0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j
0 0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0
+1 0 0 0 +1 0 0 0 -j 0 0 0 -j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0
0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0
0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -j 0 0 0 -j
0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0
0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0
0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0
+1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j
0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0
0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1
0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0
-1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0
0 -j 0 0 0 -j 0 0 0 -1 0 0 0 +1 0 0 0 -1 0 0 0 +j 0 0 0 +1 0 0 0 +1 0 0 0 +j 0 0 0 -1 0 0

The Sequence $EDMGS^{4}_{left,804}(n)$, to be transmitted from left to right, up to down 0 0 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0
0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j
0 0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0
-1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0
0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0
0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +j 0 0 0
+j 0 0 0 +1 0 0 0 -1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1
0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0
-j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0
0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j
0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0
0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1
0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0
0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1
0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0

FIG. 29

The Sequence $EDMGS^{5}_{left,804}(n)$, to be transmitted from left to right, up to down 0 0 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0
0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j
0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0
+1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0
0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j
0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -j 0 0 0 -j
0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0
0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j
0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0
0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0
+j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0
0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1
0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0
-1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0
0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0

The Sequence $EDMGS^{6}_{left,804}(n)$, to be transmitted from left to right, up to down 0 0 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0
0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j
0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -
1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0
0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0
0 0 -1 0 0 0 -j 0 0 0 -1 0 0 0 -1 0 0 0 +j 0 0 0 -j 0 0 0 +j 0 0 0 -1 0 0 0 -j 0 0 0 +j 0 0 0 -1 0 0 0 -j 0 0 0 +j 0 0 0 +j
0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0
0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0
+j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0
0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0
-j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0
0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1
0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0
0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -
1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0

FIG. 30

The Sequence $EDMGS^{7}_{left,804}(n)$, to be transmitted from left to right, up to down 0 0 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0
0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j
0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -
1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0
0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0
0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +j 0 0 0 +j
0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0
-j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0
0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -
1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j
0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0
0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0
0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1
0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0
+j 0 0 0 +j 0 0 0 +1 0 0 0 -1 0 0 0 +1 0 0 0 +j 0 0 0 +1 0 0 0 +1 0 0 0 +j 0 0 0 -1 0 0

The Sequence $EDMGS^{8}_{left,804}(n)$, to be transmitted from left to right, up to down 0 0 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0
0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j
0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0
+1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0
0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0
0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -j 0 0 0 -j
0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0
0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0
-j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j
0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0
-j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0
0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0
0 0 +1 0 0 0 -1 0 0 0 +j 0 0 0 +1 0 0 0 +1 0 0 0 -j 0 0 0 -1 0 0 0 +j 0 0 0 +j 0 0 0 +1 0 0 0 -1 0 0 0 +1 0 0 0 +j 0 0
0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0
+1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0

FIG. 31

| The Sequence $EDMGS^{1}_{right,804}(n)$, to be transmitted from left to right, up to down |
|---|
| 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j<br>0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0<br>-j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +j 0 0<br>0 +j 0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0<br>+1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0<br>0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j<br>0 0 0 +1 0 0 0 -1 0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0<br>0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0<br>0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -1 0 0 0 -1 0 0 0<br>+j 0 0 0 -j 0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0<br>0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0<br>0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -j 0 0 0 -j 0 0 0 -1 0 0 0 +1<br>0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0<br>+1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -j<br>0 0 0 -j 0 0 0 -1 0 0 0 +1 0 0 0 -1 0 0 0 +j 0 0 0 +1 0 0 0 +1 0 0 0 +j 0 0 0 -1 0 0 0 0 0 |
| The Sequence $EDMGS^{2}_{right,804}(n)$, to be transmitted from left to right, up to down |
| 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0<br>+j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0<br>0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -j 0<br>0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1<br>0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0<br>-j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0<br>0 -1 0 0 0 +1 0 0 0 -1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0<br>0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0<br>+1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +1 0 0 0 +1 0 0 0 -j<br>0 0 0 +j 0 0 0 -j 0 0 0 +1 0 0 0 -j 0 0 0 -j 0 0 0 +1 0 0 0 +j 0 0 0 +1 0 0 0 +1 0 0 0 -j 0 0 0 -j 0 0 0 -j 0 0 0 -1 0 0 0<br>+j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0<br>0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +j 0 0 0 +j 0 0 0 +1 0 0 0 -1<br>0 0 0 +1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0<br>0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j 0 0 0 -1 0 0 0 -<br>j 0 0 0 -j 0 0 0 -1 0 0 0 +1 0 0 0 -1 0 0 0 +j 0 0 0 +1 0 0 0 +1 0 0 0 +j 0 0 0 -1 0 0 0 0 0 |

FIG. 32

The Sequence $EDMGS^{3}_{right,804}$ $(n)$, to be transmitted from left to right, up to down 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j
0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0
+j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -j 0 0
0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1
0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0
0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0
0 0 -1 0 0 0 +1 0 0 0 -1 0 0 0 -j 0 0 0 -1 0 0 0 -1 0 0 0 -j 0 0 0 +1 0 0 0 -j 0 0 0 +j 0 0 0 +1 0 0 0 -1 0 0 0 +1 0 0 0
-j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0 +1 0 0 0 +j
0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +1 0 0 0 +1 0 0
0 -j 0 0 0 +j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0
0 0 -j 0 0 0 -j 0 0 0 +1 0 0 0 +j 0 0 0 -1 0 0 0 -1 0 0 0 +j 0 0 0 -j 0 0 0 +j 0 0 0 -1 0 0 0 +j 0 0 0 +j 0 0 0 -1 0 0 0 -j
0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +j 0 0 0 +j 0 0 0 +1 0 0 0
-1 0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1
0 0 0 +1 0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0
-j 0 0 0 -j 0 0 0 -1 0 0 0 +1 0 0 0 -1 0 0 0 +j 0 0 0 +1 0 0 0 +1 0 0 0 +j 0 0 0 -1 0 0 0 0 0

The Sequence $EDMGS^{4}_{right,804}$ $(n)$, to be transmitted from left to right, up to down 0 0 -1 0 0 0 -1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j
0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0
+j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +j 0 0
0 +j 0 0 0 +1 0 0 0 -1 0 0 0 +1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -
1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1
0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0
+j 0 0 0 +1 0 0 0 -1 0 0 0 +1 0 0 0 +j 0 0 0 +1 0 0 0 +1 0 0 0 -j 0 0 0 -1 0 0 0 -j 0 0 0 -j 0 0 0 -1 0 0 0 +1 0 0 0 -1
0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0 +1 0
0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 -1 0 0 0 -
1 0 0 0 +j 0 0 0 -j 0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0
0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0 0 0 +j 0 0 0 +j 0 0 0 -1 0
0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -j 0 0 0 -j 0 0 0 -1 0
0 0 +1 0 0 0 -1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -
1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0
0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 0 0

FIG. 33

The Sequence $EDMGS^{5}_{right,804}(n)$. to be transmitted from left to right, up to down 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0
+j 0 0 0 -j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0
0 -j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -j 0
0 0 -j 0 0 0 -1 0 0 0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -
1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0
0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j 0 0
0 -1 0 0 0 +1 0 0 0 -1 0 0 0 +j 0 0 0 +1 0 0 0 -1 0 0 0 +j 0 0 0 -1 0 0 0 -j 0 0 0 -j 0 0 0 -1 0 0 0 +1 0 0 0 -1 0 0 0 -j
0 0 0 -1 0 0 0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0
+1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +1 0 0 0 +1 0 0 0 -j 0
0 0 +j 0 0 0 -j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 +1 0 0 0 -j
0 0 0 -j 0 0 0 +1 0 0 0 +j 0 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0
+1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +j 0 0 0 +j 0 0 0 +1 0 0 0 -1 0
0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1 0 0 0 +j 0 0 0 +1 0 0 0
+1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0 +j 0
0 0 +j 0 0 0 +1 0 0 0 -1 0 0 0 +1 0 0 0 +j 0 0 0 +1 0 0 0 +1 0 0 0 +j 0 0 0 -1 0 0 0 0 0

The Sequence $EDMGS^{6}_{right,804}(n)$, to be transmitted from left to right, up to down 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j
0 0 0 +j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -
j 0 0 0 +1 0 0 0 +j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +j 0 0
0 +j 0 0 0 +1 0 0 0 -1 0 0 0 +1 0 0 0 -j 0 0 0 -1 0 0 0 -1 0 0 0 -j 0 0 0 +1 0 0 0 +j 0 0 0 -j 0 0 0 +1 0 0 0 -1 0 0 0
+1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1
0 0 0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0
+j 0 0 0 +1 0 0 0 -1 0 0 0 +1 0 0 0 -j 0 0 0 -1 0 0 0 -1 0 0 0 -j 0 0 0 +1 0 0 0 +j 0 0 0 +j 0 0 0 +1 0 0 0 -1 0 0 0 +1
0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0
0 -j 0 0 0 +1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -1 0 0 0 -1 0
0 0 +j 0 0 0 -j 0 0 0 +j 0 0 0 +1 0 0 0 -j 0 0 0 -j 0 0 0 +1 0 0 0 +j 0 0 0 -1 0 0 0 -1 0 0 0 +j 0 0 0 -j 0 0 0 +j 0 0 0 -1
0 0 0 +j 0 0 0 +j 0 0 0 -1 0 0 0 -j 0 0 0 -1 0 0 0 -1 0 0 0 +j 0 0 0 -j 0 0 0 +j 0 0 0 +1 0 0 0 -j 0 0 0 -j 0 0 0 +1 0 0 0
+j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -j 0 0 0 -j 0 0 0 -1 0 0
0 +1 0 0 0 -1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 -j 0 0 0 -1
0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0 -1 0 0 0
+j 0 0 0 +j 0 0 0 +1 0 0 0 -1 0 0 0 +1 0 0 0 +j 0 0 0 +1 0 0 0 +1 0 0 0 +j 0 0 0 -1 0 0 0 0 0

FIG. 34

| The Sequence $EDMGS^{7}_{right,804}(n)$, to be transmitted from left to right, up to down |
| --- |
| 0 0 -1 0 0 0 -1 0 0 0 +j 0 0 0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0<br>+j 0 0 0 -j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0<br>0 +j 0 0 0 -1 0 0 0 -j 0 0 0 +1 0 0 0 +1 0 0 0 -j 0 0 0 -j 0 0 0 -j 0 0 0 +1 0 0 0 -j 0 0 0 -j 0 0 0 +1 0 0 0 +j 0 0 0 +j 0<br>0 0 +j 0 0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -<br>1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0<br>0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 +j 0 0 0 +j 0<br>0 0 +1 0 0 0 -1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j<br>0 0 0 -1 0 0 0 -1 0 0 0 -j 0 0 0 +1 0 0 0 -j 0 0 0 -j 0 0 0 -1 0 0 0 +1 0 0 0 -1 0 0 0 +j 0 0 0 +1 0 0 0 +1 0 0 0 +j 0 0 0<br>-1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -1 0 0 0 -1 0 0 0 +j 0 0<br>0 -j 0 0 0 +j 0 0 0 +1 0 0 0 -j 0 0 0 -j 0 0 0 +1 0 0 0 +j 0 0 0 +1 0 0 0 +1 0 0 0 -j 0 0 0 +j 0 0 0 -j 0 0 0 +1 0 0 0 -j 0<br>0 0 -j 0 0 0 +1 0 0 0 +j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0<br>+1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -j 0 0 0 -j 0 0 0 -1 0 0 0 +1 0 0<br>0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0 0 0 +j 0 0 0 +1 0 0 0<br>+1 0 0 0 +j 0 0 0 -1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j 0<br>0 0 +j 0 0 0 +1 0 0 0 -1 0 0 0 +1 0 0 0 +j 0 0 0 +1 0 0 0 +1 0 0 0 +j 0 0 0 -1 0 0 0 0 0 |

| The Sequence $EDMGS^{8}_{right,804}(n)$, to be transmitted from left to right. up to down |
| --- |
| 0 0 +1 0 0 0 +1 0 0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j<br>0 0 0 +j 0 0 0 -1 0 0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0<br>+j 0 0 0 -1 0 0 0 -j 0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 -j 0 0<br>0 -j 0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0<br>+1 0 0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1<br>0 0 0 +j 0 0 0 -1 0 0 0 -j 0 0 0 -j 0 0 0 -1 0 0 0 +1 0 0 0 -1 0 0 0 -j 0 0 0 -1 0 0 0 -1 0 0 0 -j 0 0 0 +1 0 0 0 -j 0 0 0 -j<br>0 0 0 -1 0 0 0 +1 0 0 0 -1 0 0 0 +j 0 0 0 +1 0 0 0 +1 0 0 0 +j 0 0 0 -1 0 0 0 +j 0 0 0 +j 0 0 0 +1 0 0 0 -1 0 0 0 +1 0<br>0 0 +j 0 0 0 +1 0 0 0 +1 0 0 0 +j 0 0 0 -1 0 0 0 -j 0 0 0 -j 0 0 0 -1 0 0 0 +1 0 0 0 -1 0 0 0 +j 0 0 0 +1 0 0 0 +1 0 0 0<br>+j 0 0 0 -1 0 0 0 -j 0 0 0 -j 0 0 0 -1 0 0 0 -1 0 0 0 -1 0 0 0 -j 0 0 0 -1 0 0 0 -1 0 0 0 -j 0 0 0 +1 0 0 0 +1 0 0 0 +1 0<br>0 0 -j 0 0 0 +j 0 0 0 -j 0 0 0 -1 0 0 0 +j 0 0 0 +j 0 0 0 -1 0 0 0 -j 0 0 0 -1 0 0 0 -1 0 0 0 +j 0 0 0 -j 0 0 0 +j 0 0 0 -1 0<br>0 0 +j 0 0 0 +j 0 0 0 -1 0 0 0 -j 0 0 0 +1 0 0 0 +1 0 0 0 -j 0 0 0 +j 0 0 0 -j 0 0 0 -1 0 0 0 +j 0 0 0 +j 0 0 0 -1 0 0 0 -j<br>0 0 0 +1 0 0 0 +1 0 0 0 -j 0 0 0 +j 0 0 0 -j 0 0 0 +1 0 0 0 -j 0 0 0 -j 0 0 0 +1 0 0 0 +j 0 0 0 +j 0 0 0 +j 0 0 0 -1 0 0 0<br>-1 0 0 0 +1 0 0 0 -j 0 0 0 -1 0 0 0 -1 0 0 0 -j 0 0 0 +1 0 0 0 -j 0 0 0 -j 0 0 0 -1 0 0 0 +1 0 0 0 -1 0 0 0 -j 0 0 0 -1 0 0<br>0 -1 0 0 0 -j 0 0 0 +1 0 0 0 +j 0 0 0 +j 0 0 0 +1 0 0 0 -1 0 0 0 +1 0 0 0 -j 0 0 0 -1 0 0 0 -1 0 0 0 -j 0 0 0 +1 0 0 0 +j<br>0 0 0 +j 0 0 0 +1 0 0 0 -1 0 0 0 +1 0 0 0 +j 0 0 0 +1 0 0 0 +1 0 0 0 +j 0 0 0 -1 0 0 0 0 0 |

METHOD FOR TRANSMITTING AND RECEIVING SIGNAL IN WIRELESS LAN SYSTEM AND APPARATUS FOR SAID METHOD

CROSS-REFERENCE TO RELATED APPLICATIONS

This application is the National Stage filing under 35 U.S.C. 371 of International Application No. PCT/KR2017/014761, filed on Dec. 14, 2017, which claims the benefit of U.S. Provisional Application No. 62/487,488, filed on Apr. 20, 2017, and 62/491,270, filed on Apr. 28, 2017, the contents of which are all hereby incorporated by reference herein in their entireties.

BACKGROUND

Field

The following description relates to a method for transmitting and receiving a signal in a wireless LAN (WLAN) system, and, more particularly, in a case where a station transmits and receives a signal through four bonded channels, the following description relates to a method for transmitting and receiving a signal, which configures an EDMG (Enhanced Directional Multi Gigabit (EDMG) Short Training Field (STF) field for an Orthogonal Frequency Division Multiplexing (OFDM) packet, and which transmits and receives a signal including the configured EDMG STF field, and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY

Technical Objects

By applying the above-described configuration, in case a station according to the present disclosure transmits an OFDM packet through four bonded channels, by configuring an EDMG STF field using the method proposed in the present disclosure, a low Peak to Average Power Ratio (PAPR) may be achieved.

At this point, in case the station transmits and receives a signal through the bonded channels, the present disclosure proposes a method for configuring an EDMG STF field for an OFDM packet and for transmitting and receiving a signal including the configured EDMG STF field, and a device for the same.

Technical Solutions

In order to achieve the above-described object, according to an aspect of the present disclosure, proposed herein is a method for transmitting, by a first station (STA), a signal through four bonded channels to a second station (STA) in a wireless LAN (WLAN) system comprising the steps of generating an Enhanced Directional Multi Gigabit (EDMG) Short Training Field (STF) field being transmitted in an Orthogonal Frequency Division Multiplexing (OFDM) mode based on a number of channels and a space-time stream index being included in a bonded channel through which an EDMG Physical Protocol Data Unit (PPDU) is transmitted, and transmitting the EDMG PPDU including the EDMG STF field being transmitted in the OFDM mode through a space-time stream within the four bonded channels to the second STA. At this point, an EDMG STF sequence for each space-time stream being included in the EDMG STF field may be configured to have a format of {A, 0, 0, 0, B}, and A and B may respectively indicate sequences each having a length of 804, and A and B of each space-time stream may respectively be orthogonal to A and B of another space-time stream, and non-zero values included in A and B are configured based on a first sequence and a second sequence, each having a length of 5, and the first sequence and the second sequence are repeatedly included in A and B with a predetermined weight.

According to another aspect of the present disclosure, presented herein is a method for receiving, by a first station (STA), a signal through four bonded channels from a second station (STA) in a wireless LAN (WLAN) system comprising the step of receiving an Enhanced Directional Multi Gigabit (EDMG) PPDU including an EDMG Short Training Field (STF) field being generated based on a number of channels and a space-time stream index being included in a bonded channel through which an EDMG Physical Protocol Data Unit (PPDU) is transmitted, and being transmitted in the OFDM mode through a space-time stream within the four bonded channels from the second STA. At this point, an EDMG STF sequence for each space-time stream being included in the EDMG STF field may be configured to have a format of {A, 0, 0, 0, B}, and A and B may respectively indicate sequences each having a length of 804, and A and B of each space-time stream may respectively be orthogonal to A and B of another space-time stream, and non-zero values included in A and B are configured based on a first sequence and a second sequence, each having a length of 5, and the first sequence and the second sequence are repeatedly included in A and B with a predetermined weight According to yet another aspect of the present disclosure, presented herein is a station device for transmitting a signal through four bonded channels in a wireless LAN (WLAN) system comprising a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device, wherein the processor is configured to generate an Enhanced Directional Multi Gigabit (EDMG) Short Training Field (STF) field being transmitted in an Orthogonal Frequency Division Multiplexing (OFDM) mode based on a number of channels and a space-time stream index being included in a bonded channel through which an EDMG Physical Protocol Data Unit (PPDU) is transmitted, and to transmit the EDMG PPDU including the EDMG STF field being transmitted in the OFDM mode through a space-time stream within the four bonded channels to the second STA. At this point, an EDMG STF sequence for each space-time stream being included in the EDMG STF field may be configured to have a format of {A, 0, 0, 0, B}, and A and B respectively indicate sequences each having a length of 804, and A and B of each space-time stream may respectively be orthogonal to A and B of another space-time stream, and non-zero values included in A and B are configured based on a first sequence and a second sequence, each having a length of 5, and the first sequence and the second sequence are repeatedly included in A and B with a predetermined weight.

According to a further aspect of the present disclosure, presented herein is a station device for receiving a signal through one or two bonded channels in a wireless LAN (WLAN) system, comprising a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device, wherein the processor is configured to receive an Enhanced Directional Multi Gigabit (EDMG) PPDU including an EDMG Short Training Field (STF) field being generated based on a number of channels and a space-time stream index being included in a bonded channel through which an EDMG Physical Protocol Data Unit (PPDU) is transmitted, and being transmitted in the OFDM mode through a space-time stream within the four bonded channels from the second STA. At this point, an EDMG STF sequence for each space-time stream being included in the EDMG STF field may be configured to have a format of {A, 0, 0, 0, B}, and A and B respectively indicate sequences each having a length of 804, and A and B of each space-time stream may respectively be orthogonal to A and B of another space-time stream, and non-zero values included in A and B are configured based on a first sequence and a second sequence, each having a length of 5, and the first sequence and the second sequence are repeatedly included in A and B with a predetermined weight.

Herein, the EDMG STF field may be configured to have a length of 6 OFDM symbols.

Additionally, a maximum of 8 space-time streams may be used, and the first sequence ($A_0^{iSTS}(n)$) and the second sequence ($B_0^{iSTS}(n)$) of each space-time stream ($i_{STS}$) may each be configured to have a sequence as shown below in Equation 11.

$$A_0^{iSTS}(n)=[+j,+j,+1,-1,+1],\ \text{for } i_{STS}=1,2,\ldots,8$$

$$B_0^{iSTS}(n)=[+j,+1,+1,+j,-1],\ \text{for } i_{STS}=1,2,\ldots,8 \qquad \text{[Equation 11]}$$

Non-zero values included in A and B may be configured of sequences of $A_2^{iSTS}(n)$ and $B_2^{iSTS}(n)$, each being determined by Equation 12 shown below.

$$A_k^{iSTS}(n)=[W_k^{iSTS}A_{k-1}^{iSTS}(n),B_{k-1}^{iSTS}(n)]$$

$$B_k^{iSTS}(n)=[W_k^{iSTS}A_{k-1}^{iSTS}(n),-B_{k-1}^{iSTS}(n)] \qquad \text{[Equation 12]}$$

The for $W_k^{iSTS}$ each space-time stream shown in Equation 12 is determined as shown below in Table 11.

TABLE 11

| Space-time stream number | $W_k^{i_{STS}}$ |
|---|---|
| 1 | [+1, +1, +1] |
| 2 | [+1, +1, −1] |
| 3 | [+1, −1, +1] |
| 4 | [+1, −1, −1] |
| 5 | [−1, +1, +1] |
| 6 | [−1, +1, −1] |
| 7 | [−1, −1, +1] |
| 8 | [−1, −1, −1] |

At this point, A and B of each space-time stream may respectively include a {0, 0, 0} sequence between non-zero values.

Most particularly, A of each space-time stream may include a {0, 0, 0, 0} sequence being positioned in a foremost position and a {0, 0} sequence being positioned in a rearmost position, and B of each space-time stream may include a {0, 0} sequence being positioned in a foremost position and a {0, 0, 0, 0} sequence being positioned in a rearmost position.

Accordingly, A for each space-time stream ($I_{STS}$) is indicated as shown below in Table 12 to Table 19.

TABLE 12

| $I_{STS}$ | A |
|---|---|
| 1 | 0 0 0 0 0 −1 0 0 0 −1 0 0 0 +j 0 0 0 −j 0 0 0 +j 0 0 0 −1 0 0 0 +j 0 0 |
| | 0 +j 0 0 0 −1 0 0 0 −j 0 0 0 −1 0 0 0 −1 0 0 0 +j 0 0 0 −j 0 0 0 +j 0 0 |
| | 0 +1 0 0 0 −j 0 0 0 −j 0 0 0 +1 0 0 0 +j 0 0 0 −1 0 0 0 −1 0 0 0 +j 0 0 |
| | 0 −j 0 0 0 +j 0 0 0 −1 0 0 0 +j 0 0 0 +j 0 0 0 −1 0 0 0 −j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 −1 0 0 0 −1 0 0 0 +j 0 0 0 −j 0 0 0 +j 0 0 0 −1 0 0 0 +j 0 0 |
| | 0 +j 0 0 0 −1 0 0 0 −j 0 0 0 −1 0 0 0 −1 0 0 0 +j 0 0 0 −j 0 0 0 +j 0 0 |
| | 0 +1 0 0 0 −j 0 0 0 −j 0 0 0 +1 0 0 0 +j 0 0 0 −1 0 0 0 −1 0 0 0 +j 0 0 |
| | 0 −j 0 0 0 +j 0 0 0 −1 0 0 0 +j 0 0 0 +j 0 0 0 −1 0 0 0 −j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 +j 0 0 0 +j 0 0 0 +1 0 0 0 −1 0 0 0 +1 0 0 |
| | 0 −j 0 0 0 −1 0 0 0 −1 0 0 0 −j 0 0 0 +1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 −j 0 0 0 −j 0 0 0 −1 0 0 0 +1 0 0 0 −1 0 0 |
| | 0 +j 0 0 0 +1 0 0 0 +1 0 0 0 +j 0 0 0 −1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 +j 0 0 |
| | 0 +j 0 0 0 +1 0 0 0 −1 0 0 0 +1 0 0 0 −j 0 0 0 −1 0 0 0 −1 0 0 0 −j 0 0 |

TABLE 12-continued

| $I_{STS}$ | A |
|---|---|
| | 0 +1 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 +j 0 0 0 +j 0 0 0 +1 0 0 0 −1 0 0 0 +1 0 0 |
| | 0 −j 0 0 0 −1 0 0 0 −1 0 0 0 −j 0 0 0 +1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 |

TABLE 13

| $I_{STS}$ | A |
|---|---|
| 2 | 0 0 0 0 0 +1 0 0 0 +1 0 0 0 −j 0 0 0 +j 0 0 0 −j 0 0 0 +1 0 0 0 −j 0 0 |
| | 0 −j 0 0 0 +1 0 0 0 +j 0 0 0 +1 0 0 0 +1 0 0 0 −j 0 0 0 +j 0 0 0 +j 0 0 |
| | 0 −1 0 0 0 +j 0 0 0 +j 0 0 0 −1 0 0 0 −j 0 0 0 −1 0 0 0 −1 0 0 0 +j 0 0 |
| | 0 −j 0 0 0 +j 0 0 0 −1 0 0 0 +j 0 0 0 +j 0 0 0 −1 0 0 0 −j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 +1 0 0 0 +1 0 0 0 −j 0 0 0 +j 0 0 0 −j 0 0 0 +1 0 0 0 −j 0 0 |
| | 0 −j 0 0 0 +1 0 0 0 +j 0 0 0 +1 0 0 0 +1 0 0 0 −1 0 0 0 −1 0 0 0 +j 0 0 |
| | 0 −j 0 0 0 +j 0 0 0 −1 0 0 0 +j 0 0 0 +j 0 0 0 −1 0 0 0 −j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 −j 0 0 0 −j 0 0 0 −1 0 0 0 +1 0 0 0 −1 0 0 |
| | 0 +j 0 0 0 +1 0 0 0 +1 0 0 0 +j 0 0 0 −1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 +j 0 0 0 +j 0 0 0 +1 0 0 0 −1 0 0 0 +1 0 0 |
| | 0 −j 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 +j 0 0 |
| | 0 +j 0 0 0 +1 0 0 0 −1 0 0 0 +1 0 0 0 −j 0 0 0 −1 0 0 0 −1 0 0 0 −j 0 0 |
| | 0 +1 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 −j 0 0 0 −j 0 0 0 −1 0 0 0 +1 0 0 0 −1 0 0 |
| | 0 +j 0 0 0 +1 0 0 0 +1 0 0 0 +j 0 0 0 −1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 |

TABLE 14

| $I_{STS}$ | A |
|---|---|
| 3 | 0 0 0 0 0 +1 0 0 0 +1 0 0 0 −j 0 0 0 +j 0 0 0 −j 0 0 0 +1 0 0 0 −j 0 0 |
| | 0 −j 0 0 0 +1 0 0 0 +j 0 0 0 −1 0 0 0 −1 0 0 0 +j 0 0 0 −j 0 0 0 +j 0 0 |
| | 0 +1 0 0 0 −j 0 0 0 −j 0 0 0 +1 0 0 0 +j 0 0 0 +1 0 0 0 +1 0 0 0 −1 0 0 |
| | 0 +j 0 0 0 −j 0 0 0 +1 0 0 0 −j 0 0 0 −j 0 0 0 +1 0 0 0 +j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 +1 0 0 0 +1 0 0 0 −j 0 0 0 +j 0 0 0 −j 0 0 0 +1 0 0 0 −j 0 0 |
| | 0 −j 0 0 0 +1 0 0 0 +j 0 0 0 −1 0 0 0 −1 0 0 0 +j 0 0 0 −j 0 0 0 +j 0 0 |
| | 0 +1 0 0 0 −j 0 0 0 −j 0 0 0 +1 0 0 0 +j 0 0 0 +1 0 0 0 +1 0 0 0 −j 0 0 |
| | 0 +j 0 0 0 −j 0 0 0 +1 0 0 0 −j 0 0 0 −j 0 0 0 +1 0 0 0 +j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 +j 0 0 0 +j 0 0 0 +1 0 0 0 −1 0 0 0 +1 0 0 |
| | 0 −1 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 −j 0 0 0 −j 0 0 0 −1 0 0 0 +1 0 0 0 −1 0 0 |
| | 0 +1 0 0 0 +1 0 0 0 +1 0 0 0 +j 0 0 0 −1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 +j 0 0 |
| | 0 +j 0 0 0 +1 0 0 0 −1 0 0 0 +1 0 0 0 −j 0 0 0 −1 0 0 0 −1 0 0 0 −j 0 0 |
| | 0 +1 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 +j 0 0 0 +j 0 0 0 +1 0 0 0 −1 0 0 0 +1 0 0 |
| | 0 −j 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 |

TABLE 15

| $I_{STS}$ | A |
|---|---|
| 4 | 0 0 0 0 0 −1 0 0 0 −1 0 0 0 +j 0 0 0 −j 0 0 0 +j 0 0 0 −1 0 0 0 +j 0 0 |
| | 0 +j 0 0 0 −1 0 0 0 +j 0 0 0 +1 0 0 0 +1 0 0 0 −j 0 0 0 +j 0 0 0 −j 0 0 |
| | 0 −1 0 0 0 +j 0 0 0 +j 0 0 0 −1 0 0 0 −j 0 0 0 +1 0 0 0 +1 0 0 0 −j 0 0 |
| | 0 +j 0 0 0 −j 0 0 0 +1 0 0 0 −j 0 0 0 −j 0 0 0 +1 0 0 0 +j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 −1 0 0 0 −1 0 0 0 +j 0 0 0 −j 0 0 0 +j 0 0 0 −1 0 0 0 +j 0 0 |
| | 0 +j 0 0 0 −1 0 0 0 −j 0 0 0 +1 0 0 0 +1 0 0 0 −j 0 0 0 +j 0 0 0 −j 0 0 |
| | 0 −1 0 0 0 +j 0 0 0 +j 0 0 0 −1 0 0 0 +j 0 0 0 +1 0 0 0 +1 0 0 0 −j 0 0 |
| | 0 +j 0 0 0 −j 0 0 0 +1 0 0 0 −j 0 0 0 −j 0 0 0 +1 0 0 0 +j 0 0 0 +1 0 0 |
| | 0 +1 0 0 0 −j 0 0 0 +j 0 0 0 −j 0 0 0 −1 0 0 0 +j 0 0 0 +j 0 0 0 −1 0 0 |
| | 0 −j 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 −j 0 0 0 −j 0 0 0 −1 0 0 0 +1 0 0 0 −1 0 0 |
| | 0 +j 0 0 0 +1 0 0 0 +1 0 0 0 +j 0 0 0 −1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 0 −j 0 0 0 −j 0 0 0 −1 0 0 0 +1 0 0 0 −1 0 0 0 −j 0 0 0 −1 0 0 |
| | 0 −1 0 0 0 −j 0 0 0 +1 0 0 0 +j 0 0 0 +j 0 0 0 +1 0 0 0 −1 0 0 0 +1 0 0 |
| | 0 −j 0 0 0 −1 0 0 0 −1 0 0 0 −j 0 0 0 +1 0 0 0 +j 0 0 0 +j 0 0 0 +1 0 0 |
| | 0 −1 0 0 0 +1 0 0 0 +j 0 0 0 +1 0 0 0 +1 0 0 0 +j 0 0 0 −1 0 0 0 +j 0 0 |
| | 0 +j 0 0 0 +1 0 0 0 −1 0 0 0 +1 0 0 0 −j 0 0 0 −1 0 0 0 −1 0 0 0 −j 0 0 |
| | 0 +1 0 0 0 +j 0 0 0 +j 0 0 0 +1 0 0 0 −1 0 0 0 +1 0 0 0 +j 0 0 0 +1 0 0 |
| | 0 +1 0 0 0 +j 0 0 0 −1 0 0 0 −j 0 0 0 −j 0 0 0 −1 0 0 0 +1 0 0 0 −1 0 0 |
| | 0 +j 0 0 0 +1 0 0 0 +1 0 0 0 +j 0 0 0 −1 0 0 0 −j 0 0 0 −j 0 0 0 −1 0 0 |
| | 0 +1 0 0 0 −1 0 0 0 −j 0 0 0 −1 0 0 0 −1 0 0 0 −j 0 0 0 +1 0 0 0 −j 0 0 |
| | 0 −j 0 0 0 −1 0 0 0 +1 0 0 0 −1 0 0 0 +j 0 0 0 +1 0 0 0 +1 0 0 0 +j 0 0 |
| | 0 −1 0 0 |

TABLE 16

| $I_{STS}$ | A |
|---|---|
| 5 | 0 0 0 0 0 +1 0 0 0 +1 0 0 0 −j 0 0 0 +j 0 0 0 −j 0 0 0 −1 0 0 0 +j 0 0 |
| | 0 +j 0 0 0 −1 0 0 0 −j 0 0 0 +1 0 0 0 +1 0 0 0 −j 0 0 0 +j 0 0 0 −j 0 0 |
| | 0 +1 0 0 0 −j 0 0 0 −j 0 0 0 +1 0 0 0 +j 0 0 0 +1 0 0 0 +1 0 0 0 −j 0 0 |
| | 0 +j 0 0 0 −j 0 0 0 −1 0 0 0 +j 0 0 0 +j 0 0 0 −1 0 0 0 −j 0 0 0 −1 0 0 |
| | 0 −1 0 0 0 +j 0 0 0 −j 0 0 0 +j 0 0 0 −1 0 0 0 +j 0 0 0 +j 0 0 0 −1 0 0 |
| | 0 −j 0 0 0 +1 0 0 0 +1 0 0 0 −j 0 0 0 +j 0 0 0 −j 0 0 0 −1 0 0 0 +j 0 0 |
| | 0 +j 0 0 0 −1 0 0 0 −j 0 0 0 +1 0 0 0 +1 0 0 0 −j 0 0 0 +j 0 0 0 −j 0 0 |
| | 0 +1 0 0 0 −j 0 0 0 −j 0 0 0 +1 0 0 0 +j 0 0 0 +1 0 0 0 +1 0 0 0 −j 0 0 |
| | 0 +j 0 0 0 −j 0 0 0 −1 0 0 0 +j 0 0 0 +j 0 0 0 −1 0 0 0 −j 0 0 0 −1 0 0 |
| | 0 −1 0 0 0 +j 0 0 0 −j 0 0 0 +j 0 0 0 −1 0 0 0 +j 0 0 0 +j 0 0 0 −1 0 0 |
| | 0 −j 0 0 0 −j 0 0 0 −j 0 0 0 −1 0 0 0 +1 0 0 0 −1 0 0 0 +j 0 0 0 +1 0 0 |
| | 0 +1 0 0 0 +j 0 0 0 −1 0 0 0 −j 0 0 0 −j 0 0 0 −1 0 0 0 +1 0 0 0 −1 0 0 |
| | 0 −j 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 +j 0 0 0 +1 0 0 0 +1 0 0 0 +j 0 0 0 −1 0 0 0 +j 0 0 |
| | 0 +j 0 0 0 +1 0 0 0 −1 0 0 0 +1 0 0 0 +j 0 0 0 +1 0 0 0 +1 0 0 0 +j 0 0 |
| | 0 −1 0 0 0 +j 0 0 0 +j 0 0 0 +1 0 0 0 −1 0 0 0 +1 0 0 0 −j 0 0 0 −1 0 0 |
| | 0 −1 0 0 0 −j 0 0 0 +1 0 0 0 +j 0 0 0 +j 0 0 0 +1 0 0 0 −1 0 0 0 +1 0 0 |
| | 0 +j 0 0 0 +1 0 0 0 +1 0 0 0 +j 0 0 0 −1 0 0 0 +j 0 0 0 +j 0 0 0 +1 0 0 |
| | 0 −1 0 0 0 +1 0 0 0 −j 0 0 0 −1 0 0 0 −1 0 0 0 −j 0 0 0 +1 0 0 0 −j 0 0 |
| | 0 −j 0 0 0 −1 0 0 0 +1 0 0 0 −1 0 0 0 −j 0 0 0 −1 0 0 0 −1 0 0 0 −j 0 0 |
| | 0 +1 0 0 0 −j 0 0 0 −j 0 0 0 −1 0 0 0 +1 0 0 0 −1 0 0 0 +j 0 0 0 +1 0 0 |
| | 0 +1 0 0 0 +j 0 0 0 −1 0 0 0 −j 0 0 0 −j 0 0 0 −1 0 0 0 +1 0 0 0 −1 0 0 |
| | 0 −j 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 +j 0 0 0 +j 0 0 0 +1 0 0 0 +j 0 0 0 −1 0 0 0 −j 0 0 |
| | 0 +j 0 0 0 +1 0 0 0 −1 0 0 0 +1 0 0 0 +j 0 0 0 +1 0 0 0 +1 0 0 0 +j 0 0 |
| | 0 −1 0 0 |

TABLE 17

| $I_{STS}$ | A |
|---|---|
| 6 | 0 0 0 0 0 −1 0 0 0 −1 0 0 0 +j 0 0 0 −j 0 0 0 +j 0 0 0 +1 0 0 0 −j 0 0 |
| | 0 −j 0 0 0 +1 0 0 0 +j 0 0 0 −1 0 0 0 −1 0 0 0 +j 0 0 0 −j 0 0 0 +j 0 0 |
| | 0 −1 0 0 0 +j 0 0 0 +j 0 0 0 −1 0 0 0 −j 0 0 0 +1 0 0 0 +1 0 0 0 −j 0 0 |
| | 0 +j 0 0 0 −j 0 0 0 −1 0 0 0 +j 0 0 0 +j 0 0 0 −1 0 0 0 −j 0 0 0 −1 0 0 |
| | 0 −1 0 0 0 +j 0 0 0 −j 0 0 0 +j 0 0 0 −1 0 0 0 +j 0 0 0 +j 0 0 0 −1 0 0 |
| | 0 −j 0 0 0 −1 0 0 0 −1 0 0 0 +j 0 0 0 −j 0 0 0 +j 0 0 0 +1 0 0 0 −j 0 0 |
| | 0 −j 0 0 0 +1 0 0 0 +j 0 0 0 −1 0 0 0 −1 0 0 0 +j 0 0 0 −j 0 0 0 +j 0 0 |

TABLE 17-continued

| $I_{STS}$ | A |
|---|---|
| | 0 −1 0 0 0 +j 0 0 0 +j 0 0 0 −1 0 0 0 −j 0 0 0 +1 0 0 0 +1 0 0 0 −j 0 0<br>0 +j 0 0 0 −j 0 0 0 −1 0 0 0 +j 0 0 0 +j 0 0 0 −1 0 0 0 −j 0 0 0 −1 0 0<br>0 −1 0 0 0 +j 0 0 0 −j 0 0 0 +j 0 0 0 −1 0 0 0 +j 0 0 0 +j 0 0 0 −1 0 0<br>0 −j 0 0 0 +j 0 0 0 +j 0 0 0 +1 0 0 0 −1 0 0 0 +1 0 0 0 −j 0 0 0 −1 0 0<br>0 −1 0 0 0 −j 0 0 0 +1 0 0 0 +j 0 0 0 +j 0 0 0 +1 0 0 0 −1 0 0 0 +1 0 0<br>0 +j 0 0 0 +1 0 0 0 +1 0 0 0 +j 0 0 0 −1 0 0 0 −j 0 0 0 −j 0 0 0 −1 0 0<br>0 +1 0 0 0 −1 0 0 0 +j 0 0 0 +1 0 0 0 +1 0 0 0 +j 0 0 0 −1 0 0 0 +j 0 0<br>0 +j 0 0 0 +1 0 0 0 −1 0 0 0 +1 0 0 0 +j 0 0 0 +1 0 0 0 +1 0 0 0 +j 0 0<br>0 −1 0 0 0 −j 0 0 0 −j 0 0 0 −1 0 0 0 +1 0 0 0 −1 0 0 0 +j 0 0 0 +1 0 0<br>0 +1 0 0 0 +j 0 0 0 −1 0 0 0 −j 0 0 0 −j 0 0 0 −1 0 0 0 +1 0 0 0 −1 0 0<br>0 −j 0 0 0 −1 0 0 0 −1 0 0 0 −j 0 0 0 +1 0 0 0 +j 0 0 0 +j 0 0 0 +1 0 0<br>0 −1 0 0 0 +1 0 0 0 −j 0 0 0 −1 0 0 0 −1 0 0 0 −j 0 0 0 +1 0 0 0 −j 0 0<br>0 −j 0 0 0 −1 0 0 0 +1 0 0 0 −1 0 0 0 −j 0 0 0 −1 0 0 0 −1 0 0 0 −j 0 0<br>0 +1 0 0 0 +j 0 0 0 +j 0 0 0 +1 0 0 0 −1 0 0 0 +1 0 0 0 −j 0 0 0 −1 0 0<br>0 −1 0 0 0 −j 0 0 0 +1 0 0 0 +j 0 0 0 +j 0 0 0 +1 0 0 0 −1 0 0 0 +1 0 0<br>0 +j 0 0 0 +1 0 0 0 +1 0 0 0 +j 0 0 0 −1 0 0 0 −j 0 0 0 −j 0 0 0 −1 0 0<br>0 +1 0 0 0 −1 0 0 0 +j 0 0 0 +1 0 0 0 +1 0 0 0 +j 0 0 0 −1 0 0 0 +j 0 0<br>0 +j 0 0 0 +1 0 0 0 −1 0 0 0 +1 0 0 0 +j 0 0 0 +1 0 0 0 +1 0 0 0 +j 0 0<br>0 −1 0 0 |

TABLE 18

| $I_{STS}$ | |
|---|---|
| 8 | 0 0 0 0 0 −1 0 0 0 −1 0 0 0 +j 0 0 0 −j 0 0 0 +j 0 0 0 +1 0 0 0 −j 0 0<br>0 −j 0 0 0 +1 0 0 0 +j 0 0 0 −1 0 0 0 −1 0 0 0 +j 0 0 0 −j 0 0 0 +j 0 0<br>0 −1 0 0 0 +j 0 0 0 +j 0 0 0 −1 0 0 0 −j 0 0 0 +1 0 0 0 +1 0 0 0 −j 0 0<br>0 +j 0 0 0 −j 0 0 0 −1 0 0 0 +j 0 0 0 +j 0 0 0 −1 0 0 0 −j 0 0 0 −1 0 0<br>0 −1 0 0 0 +j 0 0 0 −j 0 0 0 +j 0 0 0 −1 0 0 0 +j 0 0 0 +j 0 0 0 −1 0 0<br>0 −j 0 0 0 −1 0 0 0 −1 0 0 0 +j 0 0 0 −j 0 0 0 +j 0 0 0 +1 0 0 0 −j 0 0<br>0 −j 0 0 0 +1 0 0 0 +j 0 0 0 −1 0 0 0 −1 0 0 0 +j 0 0 0 −j 0 0 0 +j 0 0<br>0 −1 0 0 0 +j 0 0 0 +j 0 0 0 −1 0 0 0 −j 0 0 0 +1 0 0 0 +1 0 0 0 −j 0 0<br>0 +j 0 0 0 −j 0 0 0 −1 0 0 0 +j 0 0 0 +j 0 0 0 −1 0 0 0 −j 0 0 0 −1 0 0<br>0 −1 0 0 0 +j 0 0 0 −j 0 0 0 +j 0 0 0 −1 0 0 0 +j 0 0 0 +j 0 0 0 −1 0 0<br>0 −j 0 0 0 +j 0 0 0 +j 0 0 0 +1 0 0 0 −1 0 0 0 +1 0 0 0 −j 0 0 0 −1 0 0<br>0 −1 0 0 0 −j 0 0 0 +1 0 0 0 +j 0 0 0 +j 0 0 0 +1 0 0 0 −1 0 0 0 +1 0 0<br>0 +j 0 0 0 +1 0 0 0 +1 0 0 0 +j 0 0 0 −1 0 0 0 −j 0 0 0 −j 0 0 0 −1 0 0<br>0 +1 0 0 0 −1 0 0 0 +j 0 0 0 +1 0 0 0 +1 0 0 0 +j 0 0 0 −1 0 0 0 +j 0 0<br>0 +j 0 0 0 +1 0 0 0 −1 0 0 0 +1 0 0 0 +j 0 0 0 +1 0 0 0 +1 0 0 0 +j 0 0<br>0 −1 0 0 0 −j 0 0 0 −j 0 0 0 −1 0 0 0 +1 0 0 0 −1 0 0 0 +j 0 0 0 +1 0 0<br>0 +1 0 0 0 +j 0 0 0 −1 0 0 0 −j 0 0 0 −j 0 0 0 −1 0 0 0 +1 0 0 0 −1 0 0<br>0 −j 0 0 0 −1 0 0 0 −1 0 0 0 −j 0 0 0 +1 0 0 0 +j 0 0 0 +j 0 0 0 +1 0 0<br>0 −1 0 0 0 +1 0 0 0 −j 0 0 0 −1 0 0 0 −1 0 0 0 −j 0 0 0 +1 0 0 0 −j 0 0<br>0 −j 0 0 0 −1 0 0 0 +1 0 0 0 −1 0 0 0 −j 0 0 0 −1 0 0 0 −1 0 0 0 −j 0 0<br>0 +1 0 0 0 +j 0 0 0 +j 0 0 0 +1 0 0 0 −1 0 0 0 +1 0 0 0 −j 0 0 0 −1 0 0<br>0 −1 0 0 0 −j 0 0 0 +1 0 0 0 +j 0 0 0 +j 0 0 0 +1 0 0 0 −1 0 0 0 +1 0 0<br>0 +j 0 0 0 +1 0 0 0 +1 0 0 0 +j 0 0 0 −1 0 0 0 −j 0 0 0 −j 0 0 0 −1 0 0<br>0 +1 0 0 0 −1 0 0 0 +j 0 0 0 +1 0 0 0 +1 0 0 0 +j 0 0 0 −1 0 0 0 +j 0 0<br>0 +j 0 0 0 +1 0 0 0 −1 0 0 0 +1 0 0 0 +j 0 0 0 +1 0 0 0 +1 0 0 0 +j 0 0<br>0 −1 0 0 |

TABLE 19

| $I_{STS}$ | |
|---|---|
| 8 | 0 0 0 0 0 +1 0 0 0 +1 0 0 0 −j 0 0 0 +j 0 0 0 −j 0 0 0 −1 0 0 0 +j 0 0<br>0 +j 0 0 0 −1 0 0 0 −j 0 0 0 −1 0 0 0 −1 0 0 0 +j 0 0 0 −j 0 0 0 +j 0 0<br>0 −1 0 0 0 +j 0 0 0 +j 0 0 0 −1 0 0 0 −j 0 0 0 −1 0 0 0 −1 0 0 0 +j 0 0<br>0 −j 0 0 0 +j 0 0 0 +1 0 0 0 −j 0 0 0 −j 0 0 0 +1 0 0 0 +j 0 0 0 −1 0 0<br>0 −1 0 0 0 +j 0 0 0 −j 0 0 0 +j 0 0 0 −1 0 0 0 +j 0 0 0 +j 0 0 0 −1 0 0<br>0 −j 0 0 0 +1 0 0 0 +1 0 0 0 −j 0 0 0 +j 0 0 0 −j 0 0 0 −1 0 0 0 +j 0 0<br>0 +j 0 0 0 −1 0 0 0 −j 0 0 0 −1 0 0 0 −1 0 0 0 +j 0 0 0 −j 0 0 0 +j 0 0<br>0 −1 0 0 0 +j 0 0 0 +j 0 0 0 −1 0 0 0 −j 0 0 0 −1 0 0 0 −1 0 0 0 +j 0 0<br>0 −j 0 0 0 +j 0 0 0 +1 0 0 0 −j 0 0 0 −j 0 0 0 +1 0 0 0 +j 0 0 0 −1 0 0<br>0 −1 0 0 0 +j 0 0 0 −j 0 0 0 +j 0 0 0 −1 0 0 0 +j 0 0 0 +j 0 0 0 −1 0 0<br>0 −j 0 0 0 −j 0 0 0 −j 0 0 0 −1 0 0 0 +1 0 0 0 −1 0 0 0 +j 0 0 0 +1 0 0<br>0 +1 0 0 0 +j 0 0 0 −1 0 0 0 +j 0 0 0 +j 0 0 0 +1 0 0 0 −1 0 0 0 +1 0 0<br>0 +j 0 0 0 +1 0 0 0 +1 0 0 0 +j 0 0 0 −1 0 0 0 +j 0 0 0 +j 0 0 0 +1 0 0<br>0 −1 0 0 0 +1 0 0 0 −j 0 0 0 −1 0 0 0 −1 0 0 0 −j 0 0 0 +1 0 0 0 +j 0 0 |

TABLE 19-continued

| $I_{STS}$ | |
|---|---|
| | 0 +j 0 0 0 +1 0 0 0 −1 0 0 0 +1 0 0 0 +j 0 0 0 +1 0 0 0 +1 0 0 0 +j 0 0 |
| | 0 −1 0 0 0 +j 0 0 0 +j 0 0 0 +1 0 0 0 −1 0 0 0 +1 0 0 0 −j 0 0 0 −1 0 0 |
| | 0 −1 0 0 0 −j 0 0 0 +1 0 0 0 −j 0 0 0 −j 0 0 0 −1 0 0 0 +1 0 0 0 −1 0 0 |
| | 0 −j 0 0 0 −1 0 0 0 −1 0 0 0 −j 0 0 0 +1 0 0 0 −j 0 0 0 −j 0 0 0 −1 0 0 |
| | 0 +1 0 0 0 −1 0 0 0 +j 0 0 0 +1 0 0 0 +1 0 0 0 +j 0 0 0 −1 0 0 0 −j 0 0 |
| | 0 −j 0 0 0 −1 0 0 0 +1 0 0 0 −1 0 0 0 −j 0 0 0 −1 0 0 0 −1 0 0 0 −j 0 0 |
| | 0 +1 0 0 0 −j 0 0 0 −j 0 0 0 −1 0 0 0 +1 0 0 0 −1 0 0 0 +j 0 0 0 +1 0 0 |
| | 0 +1 0 0 0 +j 0 0 0 −1 0 0 0 +j 0 0 0 +j 0 0 0 +1 0 0 0 −1 0 0 0 +1 0 0 |
| | 0 +j 0 0 0 +1 0 0 0 +1 0 0 0 +j 0 0 0 −1 0 0 0 +j 0 0 0 +j 0 0 0 +1 0 0 |
| | 0 −1 0 0 0 +1 0 0 0 −j 0 0 0 −1 0 0 0 −1 0 0 0 −j 0 0 0 +1 0 0 0 +j 0 0 |
| | 0 +j 0 0 0 +1 0 0 0 −1 0 0 0 +1 0 0 0 +j 0 0 0 +1 0 0 0 +1 0 0 0 +j 0 0 |
| | 0 −1 0 0 |

And, B for each space-time stream ($I_{STS}$) is indicated as shown below in Table 20 to Table 27.

TABLE 20

| $I_{STS}$ | B |
|---|---|
| 1 | 0 0 −1 0 0 0 −1 0 0 0 +j 0 0 0 −j 0 0 0 +j 0 0 0 −1 0 0 0 +j 0 0 0 +j 0 |
| | 0 0 −1 0 0 0 −j 0 0 0 −1 0 0 0 −1 0 0 0 +j 0 0 0 −j 0 0 0 +j 0 0 0 +1 0 |
| | 0 0 −j 0 0 0 −j 0 0 0 +1 0 0 0 +j 0 0 0 +1 0 0 0 +1 0 0 0 −j 0 0 0 +j 0 |
| | 0 0 −j 0 0 0 +1 0 0 0 −j 0 0 0 −j 0 0 0 +1 0 0 0 +j 0 0 0 −1 0 0 0 −1 0 |
| | 0 0 +j 0 0 0 −j 0 0 0 +j 0 0 0 +1 0 0 0 −j 0 0 0 −j 0 0 0 +1 0 0 0 +j 0 |
| | 0 0 +j 0 0 0 +j 0 0 0 +1 0 0 0 −1 0 0 0 +1 0 0 0 +j 0 0 0 +1 0 0 0 +1 0 |
| | 0 0 +j 0 0 0 −1 0 0 0 +j 0 0 0 +j 0 0 0 +1 0 0 0 −1 0 0 0 +1 0 0 0 −j 0 |
| | 0 0 −1 0 0 0 −1 0 0 0 −j 0 0 0 +1 0 0 0 −j 0 0 0 −j 0 0 0 −1 0 0 0 +1 0 |
| | 0 0 −1 0 0 0 −j 0 0 0 −1 0 0 0 −1 0 0 0 −j 0 0 0 +1 0 0 0 +j 0 0 0 +j 0 |
| | 0 0 +1 0 0 0 −1 0 0 0 +1 0 0 0 −j 0 0 0 −1 0 0 0 −1 0 0 0 −j 0 0 0 +1 0 |
| | 0 0 +j 0 0 0 +j 0 0 0 +1 0 0 0 −1 0 0 0 +1 0 0 0 +j 0 0 0 +1 0 0 0 +1 0 |
| | 0 0 +j 0 0 0 −1 0 0 0 +j 0 0 0 +j 0 0 0 +1 0 0 0 −1 0 0 0 +1 0 0 0 −j 0 |
| | 0 0 −1 0 0 0 −1 0 0 0 −j 0 0 0 +1 0 0 0 −j 0 0 0 −j 0 0 0 −1 0 0 0 +1 0 |
| | 0 0 −1 0 0 0 −j 0 0 0 −1 0 0 0 −1 0 0 0 −j 0 0 0 +1 0 0 0 +j 0 0 0 +j 0 |
| | 0 0 +1 0 0 0 −1 0 0 0 +1 0 0 0 −j 0 0 0 −1 0 0 0 −1 0 0 0 −j 0 0 0 +1 0 |
| | 0 0 −1 0 0 0 −1 0 0 0 +j 0 0 0 −j 0 0 0 +j 0 0 0 −1 0 0 0 +j 0 0 0 +j 0 |
| | 0 0 −1 0 0 0 −j 0 0 0 −1 0 0 0 −1 0 0 0 +j 0 0 0 −j 0 0 0 +j 0 0 0 +1 0 |
| | 0 0 −j 0 0 0 −j 0 0 0 +1 0 0 0 +j 0 0 0 +1 0 0 0 +1 0 0 0 −j 0 0 0 +j 0 |
| | 0 0 −j 0 0 0 +1 0 0 0 −j 0 0 0 −j 0 0 0 +1 0 0 0 +j 0 0 0 −1 0 0 0 −1 0 |
| | 0 0 +j 0 0 0 −j 0 0 0 +j 0 0 0 +1 0 0 0 −j 0 0 0 −j 0 0 0 +1 0 0 0 +j 0 |
| | 0 0 −j 0 0 0 −j 0 0 0 −1 0 0 0 +1 0 0 0 −1 0 0 0 −j 0 0 0 −1 0 0 0 −1 0 |
| | 0 0 −j 0 0 0 +1 0 0 0 −j 0 0 0 −j 0 0 0 −1 0 0 0 +1 0 0 0 −1 0 0 0 +j 0 |
| | 0 0 +1 0 0 0 +1 0 0 0 +j 0 0 0 −1 0 0 0 +j 0 0 0 +j 0 0 0 +1 0 0 0 −1 0 |
| | 0 0 +1 0 0 0 +j 0 0 0 +1 0 0 0 +1 0 0 0 +j 0 0 0 −1 0 0 0 −j 0 0 0 −j 0 |
| | 0 0 −1 0 0 0 +1 0 0 0 −1 0 0 0 +j 0 0 0 +1 0 0 0 +1 0 0 0 +1 0 0 0 −1 0 |
| | 0 0 0 0 |

TABLE 21

| $I_{STS}$ | B |
|---|---|
| 2 | 0 0 +1 0 0 0 +1 0 0 0 −j 0 0 0 +j 0 0 0 −j 0 0 0 +1 0 0 0 −j 0 0 0 −j 0 |
| | 0 0 +1 0 0 0 +j 0 0 0 +1 0 0 0 +1 0 0 0 −j 0 0 0 +j 0 0 0 −j 0 0 0 −1 0 |
| | 0 0 +j 0 0 0 +j 0 0 0 −1 0 0 0 −j 0 0 0 +1 0 0 0 +1 0 0 0 −j 0 0 0 +1 0 |
| | 0 0 −j 0 0 0 +1 0 0 0 −j 0 0 0 −j 0 0 0 +1 0 0 0 +j 0 0 0 −1 0 0 0 −1 0 |
| | 0 0 +j 0 0 0 −j 0 0 0 +j 0 0 0 +1 0 0 0 −j 0 0 0 −j 0 0 0 +1 0 0 0 +j 0 |
| | 0 0 −j 0 0 0 −j 0 0 0 −1 0 0 0 +1 0 0 0 −1 0 0 0 −j 0 0 0 −1 0 0 0 −1 0 |
| | 0 0 −j 0 0 0 +1 0 0 0 −j 0 0 0 −j 0 0 0 −1 0 0 0 +1 0 0 0 −1 0 0 0 +j 0 |
| | 0 0 +1 0 0 0 +1 0 0 0 +j 0 0 0 −1 0 0 0 −j 0 0 0 −j 0 0 0 −1 0 0 0 +1 0 |
| | 0 0 −1 0 0 0 −j 0 0 0 −1 0 0 0 −1 0 0 0 −j 0 0 0 +1 0 0 0 +j 0 0 0 +j 0 |
| | 0 0 +1 0 0 0 −1 0 0 0 +1 0 0 0 −j 0 0 0 −1 0 0 0 −1 0 0 0 −j 0 0 0 +1 0 |
| | 0 0 −j 0 0 0 −j 0 0 0 −1 0 0 0 +1 0 0 0 −1 0 0 0 −j 0 0 0 −1 0 0 0 −1 0 |
| | 0 0 +i 0 0 0 +1 0 0 0 −j 0 0 0 −j 0 0 0 −1 0 0 0 +1 0 0 0 −1 0 0 0 +j 0 |
| | 0 0 +1 0 0 0 +1 0 0 0 +j 0 0 0 −1 0 0 0 −j 0 0 0 −j 0 0 0 −1 0 0 0 +1 0 |
| | 0 0 −1 0 0 0 −j 0 0 0 −1 0 0 0 −1 0 0 0 −j 0 0 0 +1 0 0 0 +j 0 0 0 +j 0 |
| | 0 0 +1 0 0 0 −1 0 0 0 +1 0 0 0 −j 0 0 0 −1 0 0 0 −1 0 0 0 −j 0 0 0 +1 0 |
| | 0 0 +1 0 0 0 +1 0 0 0 −j 0 0 0 +j 0 0 0 −j 0 0 0 +1 0 0 0 −j 0 0 0 −j 0 |
| | 0 0 +1 0 0 0 +j 0 0 0 +1 0 0 0 +1 0 0 0 −j 0 0 0 +j 0 0 0 −j 0 0 0 −1 0 |
| | 0 0 +j 0 0 0 +j 0 0 0 −1 0 0 0 −j 0 0 0 +1 0 0 0 +1 0 0 0 −j 0 0 0 +j 0 |
| | 0 0 −j 0 0 0 +1 0 0 0 −j 0 0 0 −j 0 0 0 +1 0 0 0 +j 0 0 0 −j 0 0 0 −1 0 |
| | 0 0 +j 0 0 0 −j 0 0 0 +j 0 0 0 +1 0 0 0 −j 0 0 0 −j 0 0 0 −1 0 0 0 +j 0 |

TABLE 21-continued

| $I_{STS}$ | B |
|---|---|
| | 0 0 +j 0 0 0 +j 0 0 0 +1 0 0 0 −1 0 0 0 +1 0 0 0 +j 0 0 0 +1 0 0 0 +1 0<br>0 0 +j 0 0 0 −1 0 0 0 +j 0 0 0 +j 0 0 0 +1 0 0 0 −1 0 0 0 +1 0 0 0 −j 0<br>0 0 −1 0 0 0 −1 0 0 0 −j 0 0 0 +1 0 0 0 +j 0 0 0 +j 0 0 0 +1 0 0 0 −1 0<br>0 0 +1 0 0 0 +j 0 0 0 +1 0 0 0 +1 0 0 0 +j 0 0 0 −1 0 0 0 −j 0 0 0 −j 0<br>0 0 −1 0 0 0 +1 0 0 0 −1 0 0 0 +j 0 0 0 +1 0 0 0 +1 0 0 0 −j 0 0 0 −1 0<br>0 0 0 0 |

TABLE 22

| $I_{STS}$ | B |
|---|---|
| 3 | 0 0 +1 0 0 0 +1 0 0 0 −j 0 0 0 +j 0 0 0 −j 0 0 0 +1 0 0 0 −j 0 0 0 −j 0<br>0 0 +1 0 0 0 +j 0 0 0 −1 0 0 0 −1 0 0 0 +j 0 0 0 −j 0 0 0 +j 0 0 0 +1 0<br>0 0 −j 0 0 0 −j 0 0 0 +1 0 0 0 +j 0 0 0 −1 0 0 0 −1 0 0 0 +j 0 0 0 −j 0<br>0 0 +j 0 0 0 −1 0 0 0 +j 0 0 0 +j 0 0 0 −1 0 0 0 −j 0 0 0 −1 0 0 0 −1 0<br>0 0 +j 0 0 0 −j 0 0 0 +j 0 0 0 +1 0 0 0 −j 0 0 0 −j 0 0 0 +1 0 0 0 +j 0<br>0 0 −j 0 0 0 −j 0 0 0 −1 0 0 0 +1 0 0 0 −1 0 0 0 −j 0 0 0 −1 0 0 0 −1 0<br>0 0 −j 0 0 0 +1 0 0 0 +j 0 0 0 +j 0 0 0 +1 0 0 0 −1 0 0 0 +1 0 0 0 −j 0<br>0 0 −1 0 0 0 −1 0 0 0 −j 0 0 0 +1 0 0 0 +j 0 0 0 +j 0 0 0 +1 0 0 0 −1 0<br>0 0 +1 0 0 0 +j 0 0 0 +1 0 0 0 +1 0 0 0 +j 0 0 0 −1 0 0 0 +j 0 0 0 +j 0<br>0 0 +1 0 0 0 −1 0 0 0 +1 0 0 0 −j 0 0 0 −1 0 0 0 −1 0 0 0 −j 0 0 0 +1 0<br>0 0 −j 0 0 0 −j 0 0 0 −1 0 0 0 +1 0 0 0 −1 0 0 0 −j 0 0 0 −1 0 0 0 −1 0<br>0 0 −j 0 0 0 +1 0 0 0 +j 0 0 0 +j 0 0 0 +1 0 0 0 −1 0 0 0 +1 0 0 0 −j 0<br>0 0 −1 0 0 0 −1 0 0 0 −j 0 0 0 +1 0 0 0 +j 0 0 0 +j 0 0 0 +1 0 0 0 −1 0<br>0 0 +1 0 0 0 +j 0 0 0 +1 0 0 0 +1 0 0 0 +j 0 0 0 −1 0 0 0 +j 0 0 0 +j 0<br>0 0 +1 0 0 0 −1 0 0 0 +1 0 0 0 −j 0 0 0 −1 0 0 0 −1 0 0 0 −j 0 0 0 +1 0<br>0 0 +1 0 0 0 +1 0 0 0 −j 0 0 0 +j 0 0 0 −j 0 0 0 +1 0 0 0 −j 0 0 0 −j 0<br>0 0 +1 0 0 0 +j 0 0 0 −1 0 0 0 −1 0 0 0 +j 0 0 0 −j 0 0 0 +j 0 0 0 +1 0<br>0 0 −j 0 0 0 −j 0 0 0 +1 0 0 0 +j 0 0 0 −1 0 0 0 −1 0 0 0 +j 0 0 0 −j 0<br>0 0 +j 0 0 0 −1 0 0 0 +j 0 0 0 +j 0 0 0 −1 0 0 0 −j 0 0 0 −1 0 0 0 −1 0<br>0 0 +j 0 0 0 −j 0 0 0 +j 0 0 0 +1 0 0 0 −j 0 0 0 −j 0 0 0 +1 0 0 0 +j 0<br>0 0 +j 0 0 0 +j 0 0 0 +1 0 0 0 −1 0 0 0 +1 0 0 0 +j 0 0 0 +1 0 0 0 +1 0<br>0 0 +j 0 0 0 −1 0 0 0 −j 0 0 0 −j 0 0 0 −1 0 0 0 +1 0 0 0 −1 0 0 0 +j 0<br>0 0 +1 0 0 0 +1 0 0 0 +j 0 0 0 −1 0 0 0 −j 0 0 0 −j 0 0 0 −1 0 0 0 +1 0<br>0 0 −1 0 0 0 −j 0 0 0 −1 0 0 0 −1 0 0 0 −j 0 0 0 +1 0 0 0 −j 0 0 0 −j 0<br>0 0 −1 0 0 0 +1 0 0 0 −1 0 0 0 +j 0 0 0 +1 0 0 0 +1 0 0 0 +j 0 0 0 −1 0<br>0 0 0 0 |

TABLE 23

| $I_{STS}$ | B |
|---|---|
| 4 | 0 0 −1 0 0 0 −1 0 0 0 +j 0 0 0 −j 0 0 0 +j 0 0 0 −1 0 0 0 +j 0 0 0 +j 0<br>0 0 −1 0 0 0 −j 0 0 0 +1 0 0 0 +1 0 0 0 −j 0 0 0 +j 0 0 0 −j 0 0 0 −1 0<br>0 0 +j 0 0 0 +j 0 0 0 −1 0 0 0 −j 0 0 0 −1 0 0 0 −1 0 0 0 +j 0 0 0 −j 0<br>0 0 +j 0 0 0 −1 0 0 0 +j 0 0 0 +j 0 0 0 −1 0 0 0 −j 0 0 0 −1 0 0 0 −1 0<br>0 0 +j 0 0 0 −j 0 0 0 +j 0 0 0 +1 0 0 0 −j 0 0 0 −j 0 0 0 +1 0 0 0 +j 0<br>0 0 +j 0 0 0 +j 0 0 0 +1 0 0 0 −1 0 0 0 +1 0 0 0 +j 0 0 0 +1 0 0 0 +1 0<br>0 0 +j 0 0 0 −1 0 0 0 −j 0 0 0 −j 0 0 0 −1 0 0 0 +1 0 0 0 −1 0 0 0 +j 0<br>0 0 +1 0 0 0 +1 0 0 0 +j 0 0 0 −1 0 0 0 +j 0 0 0 +j 0 0 0 +1 0 0 0 −1 0<br>0 0 +1 0 0 0 +j 0 0 0 +1 0 0 0 +1 0 0 0 +j 0 0 0 −1 0 0 0 +j 0 0 0 +j 0<br>0 0 +1 0 0 0 −1 0 0 0 +1 0 0 0 −j 0 0 0 −1 0 0 0 −1 0 0 0 −j 0 0 0 +1 0<br>0 0 +j 0 0 0 +j 0 0 0 +1 0 0 0 −1 0 0 0 +1 0 0 0 +j 0 0 0 +1 0 0 0 +1 0<br>0 0 +j 0 0 0 −1 0 0 0 −j 0 0 0 −j 0 0 0 −1 0 0 0 +1 0 0 0 −1 0 0 0 +j 0<br>0 0 +1 0 0 0 +1 0 0 0 +j 0 0 0 −1 0 0 0 +j 0 0 0 +j 0 0 0 +1 0 0 0 −1 0<br>0 0 +1 0 0 0 +j 0 0 0 +1 0 0 0 +1 0 0 0 +j 0 0 0 −1 0 0 0 +j 0 0 0 +j 0<br>0 0 +1 0 0 0 −1 0 0 0 +1 0 0 0 −j 0 0 0 −1 0 0 0 −1 0 0 0 −j 0 0 0 +1 0<br>0 0 −1 0 0 0 −1 0 0 0 +j 0 0 0 −j 0 0 0 +j 0 0 0 −1 0 0 0 +j 0 0 0 +j 0<br>0 0 −1 0 0 0 −j 0 0 0 +1 0 0 0 +1 0 0 0 −j 0 0 0 +j 0 0 0 −j 0 0 0 −1 0<br>0 0 +j 0 0 0 +j 0 0 0 −1 0 0 0 −j 0 0 0 −1 0 0 0 −1 0 0 0 +j 0 0 0 −j 0<br>0 0 +j 0 0 0 −1 0 0 0 +j 0 0 0 +j 0 0 0 −1 0 0 0 −j 0 0 0 −1 0 0 0 −1 0<br>0 0 +j 0 0 0 −j 0 0 0 +j 0 0 0 +1 0 0 0 −j 0 0 0 −j 0 0 0 +1 0 0 0 +j 0<br>0 0 −j 0 0 0 −j 0 0 0 −1 0 0 0 +1 0 0 0 −1 0 0 0 −j 0 0 0 −1 0 0 0 −1 0<br>0 0 −j 0 0 0 +1 0 0 0 +j 0 0 0 +j 0 0 0 +1 0 0 0 −1 0 0 0 +1 0 0 0 −j 0<br>0 0 −1 0 0 0 −1 0 0 0 −j 0 0 0 +1 0 0 0 −j 0 0 0 −j 0 0 0 −1 0 0 0 +1 0<br>0 0 −1 0 0 0 −j 0 0 0 −1 0 0 0 −1 0 0 0 −j 0 0 0 +1 0 0 0 −j 0 0 0 −j 0<br>0 0 −1 0 0 0 +1 0 0 0 −1 0 0 0 +j 0 0 0 +1 0 0 0 +1 0 0 0 +j 0 0 0 −1 0<br>0 0 0 0 |

TABLE 24

| $I_{STS}$ | B |
|---|---|
| 5 | 0 0 +1 0 0 0 +1 0 0 0 −j 0 0 0 +j 0 0 0 −j 0 0 0 −1 0 0 0 +j 0 0 0 +j 0 |
| | 0 0 −1 0 0 0 −j 0 0 0 +1 0 0 0 +1 0 0 0 −j 0 0 0 +j 0 0 0 −j 0 0 0 +1 0 |
| | 0 0 −j 0 0 0 −j 0 0 0 +1 0 0 0 +j 0 0 0 −1 0 0 0 −1 0 0 0 +j 0 0 0 −j 0 |
| | 0 0 +j 0 0 0 +1 0 0 0 −j 0 0 0 −j 0 0 0 +1 0 0 0 +j 0 0 0 +1 0 0 0 +1 0 |
| | 0 0 −j 0 0 0 +j 0 0 0 −j 0 0 0 +1 0 0 0 −j 0 0 0 −j 0 0 0 +1 0 0 0 +j 0 |
| | 0 0 −j 0 0 0 −j 0 0 0 −1 0 0 0 +1 0 0 0 −1 0 0 0 +j 0 0 0 +1 0 0 0 +1 0 |
| | 0 0 +j 0 0 0 −1 0 0 0 −j 0 0 0 −j 0 0 0 −1 0 0 0 +1 0 0 0 −1 0 0 0 −j 0 |
| | 0 0 −1 0 0 0 −1 0 0 0 −j 0 0 0 +1 0 0 0 +j 0 0 0 +j 0 0 0 +1 0 0 0 −1 0 |
| | 0 0 +1 0 0 0 −j 0 0 0 −1 0 0 0 −1 0 0 0 −j 0 0 0 +1 0 0 0 =j 0 0 0 −j 0 |
| | 0 0 −1 0 0 0 +1 0 0 0 −1 0 0 0 −j 0 0 0 −1 0 0 0 −1 0 0 0 −j 0 0 0 +1 0 |
| | 0 0 −j 0 0 0 −j 0 0 0 −1 0 0 0 +1 0 0 0 −1 0 0 0 +j 0 0 0 +1 0 0 0 +1 0 |
| | 0 0 +j 0 0 0 −1 0 0 0 −j 0 0 0 −j 0 0 0 −1 0 0 0 +1 0 0 0 −1 0 0 0 −j 0 |
| | 0 0 −1 0 0 0 −1 0 0 0 −j 0 0 0 +1 0 0 0 +j 0 0 0 +j 0 0 0 +1 0 0 0 −1 0 |
| | 0 0 +1 0 0 0 −j 0 0 0 −1 0 0 0 −1 0 0 0 −j 0 0 0 +1 0 0 0 −j 0 0 0 −j 0 |
| | 0 0 −1 0 0 0 +1 0 0 0 −1 0 0 0 −j 0 0 0 −1 0 0 0 −1 0 0 0 −j 0 0 0 +1 0 |
| | 0 0 +1 0 0 0 +1 0 0 0 −j 0 0 0 +j 0 0 0 −j 0 0 0 −1 0 0 0 +j 0 0 0 +j 0 |
| | 0 0 −1 0 0 0 −j 0 0 0 +1 0 0 0 +1 0 0 0 −j 0 0 0 +j 0 0 0 −j 0 0 0 +1 0 |
| | 0 0 −j 0 0 0 −j 0 0 0 +1 0 0 0 +j 0 0 0 −1 0 0 0 −1 0 0 0 +j 0 0 0 −j 0 |
| | 0 0 +j 0 0 0 +1 0 0 0 −j 0 0 0 −j 0 0 0 +1 0 0 0 +j 0 0 0 +1 0 0 0 +1 0 |
| | 0 0 −j 0 0 0 +j 0 0 0 −j 0 0 0 +1 0 0 0 −j 0 0 0 −j 0 0 0 +1 0 0 0 +j 0 |
| | 0 0 +j 0 0 0 +j 0 0 0 +1 0 0 0 −1 0 0 0 +1 0 0 0 −j 0 0 0 −1 0 0 0 −1 0 |
| | 0 0 −j 0 0 0 +1 0 0 0 +j 0 0 0 +j 0 0 0 +1 0 0 0 −1 0 0 0 +1 0 0 0 +j 0 |
| | 0 0 +1 0 0 0 +1 0 0 0 +j 0 0 0 −1 0 0 0 −j 0 0 0 −j 0 0 0 −1 0 0 0 +1 0 |
| | 0 0 −1 0 0 0 +j 0 0 0 +1 0 0 0 +1 0 0 0 +j 0 0 0 −1 0 0 0 +j 0 0 0 +1 0 |
| | 0 0 +1 0 0 0 −1 0 0 0 +1 0 0 0 +j 0 0 0 +1 0 0 0 +1 0 0 0 +j 0 0 0 −1 0 |
| | 0 0 0 0 |

TABLE 25

| $I_{STS}$ | B |
|---|---|
| 5 | 0 0 −1 0 0 0 −1 0 0 0 +j 0 0 0 −j 0 0 0 +j 0 0 0 +1 0 0 0 −j 0 0 0 −j 0 |
| | 0 0 +1 0 0 0 +j 0 0 0 −1 0 0 0 −1 0 0 0 +j 0 0 0 −j 0 0 0 +j 0 0 0 −1 0 |
| | 0 0 +j 0 0 0 +j 0 0 0 −1 0 0 0 −j 0 0 0 −1 0 0 0 −1 0 0 0 +j 0 0 0 −j 0 |
| | 0 0 +j 0 0 0 +1 0 0 0 −j 0 0 0 −j 0 0 0 +1 0 0 0 +j 0 0 0 +1 0 0 0 +1 0 |
| | 0 0 −j 0 0 0 +j 0 0 0 −j 0 0 0 +1 0 0 0 −j 0 0 0 −j 0 0 0 +1 0 0 0 +j 0 |
| | 0 0 +j 0 0 0 +j 0 0 0 +1 0 0 0 −1 0 0 0 +1 0 0 0 −j 0 0 0 −1 0 0 0 −1 0 |
| | 0 0 −j 0 0 0 +1 0 0 0 +j 0 0 0 +j 0 0 0 +1 0 0 0 −1 0 0 0 +1 0 0 0 +j 0 |
| | 0 0 +1 0 0 0 +1 0 0 0 +j 0 0 0 −1 0 0 0 +j 0 0 0 +j 0 0 0 +1 0 0 0 −1 0 |
| | 0 0 +1 0 0 0 −j 0 0 0 −1 0 0 0 −1 0 0 0 −j 0 0 0 +1 0 0 0 −j 0 0 0 −j 0 |
| | 0 0 −1 0 0 0 +1 0 0 0 −1 0 0 0 −j 0 0 0 −1 0 0 0 −1 0 0 0 −j 0 0 0 +1 0 |
| | 0 0 +j 0 0 0 +j 0 0 0 +1 0 0 0 −1 0 0 0 +1 0 0 0 −j 0 0 0 −1 0 0 0 −1 0 |
| | 0 0 −j 0 0 0 +1 0 0 0 +j 0 0 0 +j 0 0 0 +1 0 0 0 −1 0 0 0 +1 0 0 0 +j 0 |
| | 0 0 +1 0 0 0 +1 0 0 0 +j 0 0 0 −1 0 0 0 +j 0 0 0 +j 0 0 0 +1 0 0 0 −1 0 |
| | 0 0 +1 0 0 0 −j 0 0 0 −1 0 0 0 −1 0 0 0 −j 0 0 0 +1 0 0 0 −j 0 0 0 −j 0 |
| | 0 0 −1 0 0 0 +1 0 0 0 −1 0 0 0 −j 0 0 0 −1 0 0 0 −1 0 0 0 −j 0 0 0 +1 0 |
| | 0 0 −1 0 0 0 −1 0 0 0 +j 0 0 0 −j 0 0 0 +j 0 0 0 +1 0 0 0 −j 0 0 0 −j 0 |
| | 0 0 +1 0 0 0 +j 0 0 0 −1 0 0 0 −1 0 0 0 +j 0 0 0 −j 0 0 0 +j 0 0 0 −1 0 |
| | 0 0 +j 0 0 0 +j 0 0 0 −1 0 0 0 −j 0 0 0 −1 0 0 0 −1 0 0 0 +j 0 0 0 −j 0 |
| | 0 0 +j 0 0 0 +1 0 0 0 −j 0 0 0 −j 0 0 0 +1 0 0 0 +j 0 0 0 +1 0 0 0 +1 0 |
| | 0 0 −j 0 0 0 +j 0 0 0 −j 0 0 0 +1 0 0 0 −j 0 0 0 −j 0 0 0 +1 0 0 0 +j 0 |
| | 0 0 −j 0 0 0 −j 0 0 0 −1 0 0 0 +1 0 0 0 −1 0 0 0 +j 0 0 0 +1 0 0 0 +1 0 |
| | 0 0 +j 0 0 0 −1 0 0 0 −j 0 0 0 −j 0 0 0 −1 0 0 0 +1 0 0 0 −1 0 0 0 −j 0 |
| | 0 0 −1 0 0 0 −1 0 0 0 −j 0 0 0 +1 0 0 0 −j 0 0 0 −j 0 0 0 −1 0 0 0 +1 0 |
| | 0 0 −1 0 0 0 +j 0 0 0 +1 0 0 0 +1 0 0 0 +j 0 0 0 −1 0 0 0 +j 0 0 0 +j 0 |
| | 0 0 +1 0 0 0 −1 0 0 0 +1 0 0 0 +j 0 0 0 +1 0 0 0 +1 0 0 0 +j 0 0 0 −1 0 |
| | 0 0 0 0 |

TABLE 26

| $I_{STS}$ | B |
|---|---|
| 6 | 0 0 −1 0 0 0 −1 0 0 0 +j 0 0 0 −j 0 0 0 +j 0 0 0 +1 0 0 0 −j 0 0 0 −j 0 |
| | 0 0 +1 0 0 0 +j 0 0 0 −1 0 0 0 −1 0 0 0 +j 0 0 0 −j 0 0 0 +j 0 0 0 −1 0 |
| | 0 0 +j 0 0 0 +j 0 0 0 −1 0 0 0 −j 0 0 0 −1 0 0 0 −1 0 0 0 +j 0 0 0 −j 0 |
| | 0 0 +j 0 0 0 +1 0 0 0 −j 0 0 0 −j 0 0 0 +1 0 0 0 +j 0 0 0 +1 0 0 0 +1 0 |
| | 0 0 −j 0 0 0 +j 0 0 0 −j 0 0 0 +1 0 0 0 −j 0 0 0 −j 0 0 0 +1 0 0 0 +j 0 |
| | 0 0 +j 0 0 0 +j 0 0 0 +1 0 0 0 −1 0 0 0 +1 0 0 0 −j 0 0 0 −1 0 0 0 −1 0 |
| | 0 0 −j 0 0 0 +1 0 0 0 +j 0 0 0 +j 0 0 0 +1 0 0 0 −1 0 0 0 +1 0 0 0 +j 0 |

TABLE 26-continued

| $I_{STS}$ | B |
|---|---|
| | 0 0 +1 0 0 0 +1 0 0 0 +j 0 0 0 −1 0 0 0 +j 0 0 0 +j 0 0 0 +1 0 0 0 −1 0<br>0 0 +1 0 0 0 −j 0 0 0 −1 0 0 0 −1 0 0 0 −j 0 0 0 +1 0 0 0 −j 0 0 0 −j 0<br>0 0 −1 0 0 0 +1 0 0 0 −1 0 0 0 −j 0 0 0 −1 0 0 0 −1 0 0 0 −j 0 0 0 +1 0<br>0 0 +j 0 0 0 +j 0 0 0 +1 0 0 0 −1 0 0 0 +1 0 0 0 −j 0 0 0 −1 0 0 0 −1 0<br>0 0 −j 0 0 0 +1 0 0 0 +j 0 0 0 +j 0 0 0 +1 0 0 0 −1 0 0 0 +1 0 0 0 +j 0<br>0 0 +1 0 0 0 +1 0 0 0 +j 0 0 0 −1 0 0 0 +j 0 0 0 +j 0 0 0 +1 0 0 0 −1 0<br>0 0 +1 0 0 0 −j 0 0 0 −1 0 0 0 −1 0 0 0 −j 0 0 0 +1 0 0 0 −j 0 0 0 −j 0<br>0 0 −1 0 0 0 +1 0 0 0 −1 0 0 0 −j 0 0 0 −1 0 0 0 −1 0 0 0 −j 0 0 0 +1 0<br>0 0 −1 0 0 0 −1 0 0 0 +j 0 0 0 −j 0 0 0 +j 0 0 0 +1 0 0 0 −j 0 0 0 −j 0<br>0 0 +1 0 0 0 +j 0 0 0 −1 0 0 0 −1 0 0 0 +j 0 0 0 −j 0 0 0 +j 0 0 0 −1 0<br>0 0 +j 0 0 0 +j 0 0 0 −1 0 0 0 −j 0 0 0 −1 0 0 0 −1 0 0 0 +j 0 0 0 −j 0<br>0 0 +j 0 0 0 +1 0 0 0 −j 0 0 0 −j 0 0 0 +1 0 0 0 +j 0 0 0 +1 0 0 0 +1 0<br>0 0 −j 0 0 0 +j 0 0 0 −j 0 0 0 +1 0 0 0 −j 0 0 0 −j 0 0 0 +1 0 0 0 +j 0<br>0 0 −j 0 0 0 −j 0 0 0 −1 0 0 0 +1 0 0 0 −1 0 0 0 +j 0 0 0 +1 0 0 0 +1 0<br>0 0 +j 0 0 0 −1 0 0 0 −j 0 0 0 −j 0 0 0 −1 0 0 0 +1 0 0 0 −1 0 0 0 −j 0<br>0 0 −1 0 0 0 −1 0 0 0 −j 0 0 0 +1 0 0 0 −j 0 0 0 −j 0 0 0 −1 0 0 0 +1 0<br>0 0 −1 0 0 0 +j 0 0 0 +1 0 0 0 +1 0 0 0 +j 0 0 0 −1 0 0 0 +j 0 0 0 +j 0<br>0 0 +1 0 0 0 −1 0 0 0 +1 0 0 0 +j 0 0 0 +1 0 0 0 +1 0 0 0 +j 0 0 0 −1 0<br>0 0 0 0 |

TABLE 27

| $I_{STS}$ | B |
|---|---|
| 8 | 0 0 +1 0 0 0 +1 0 0 0 −j 0 0 0 +j 0 0 0 −j 0 0 0 −1 0 0 0 +j 0 0 0 +j 0<br>0 0 −1 0 0 0 −j 0 0 0 −1 0 0 0 −1 0 0 0 +j 0 0 0 −j 0 0 0 +j 0 0 0 −1 0<br>0 0 +j 0 0 0 +j 0 0 0 −1 0 0 0 −j 0 0 0 +1 0 0 0 +1 0 0 0 −j 0 0 0 +j 0<br>0 0 −j 0 0 0 −1 0 0 0 +j 0 0 0 +j 0 0 0 −1 0 0 0 −j 0 0 0 +1 0 0 0 +1 0<br>0 0 −j 0 0 0 +j 0 0 0 −j 0 0 0 +1 0 0 0 −j 0 0 0 −j 0 0 0 +1 0 0 0 +j 0<br>0 0 −j 0 0 0 −j 0 0 0 −1 0 0 0 +1 0 0 0 −1 0 0 0 +j 0 0 0 +1 0 0 0 +1 0<br>0 0 +j 0 0 0 −1 0 0 0 +j 0 0 0 +j 0 0 0 +1 0 0 0 −1 0 0 0 +1 0 0 0 +j 0<br>0 0 +1 0 0 0 +1 0 0 0 +j 0 0 0 −1 0 0 0 −j 0 0 0 −j 0 0 0 −1 0 0 0 +1 0<br>0 0 −1 0 0 0 +j 0 0 0 +1 0 0 0 +1 0 0 0 +j 0 0 0 −1 0 0 0 −j 0 0 0 −j 0<br>0 0 −1 0 0 0 +1 0 0 0 −1 0 0 0 −j 0 0 0 −1 0 0 0 −1 0 0 0 −j 0 0 0 +1 0<br>0 0 −j 0 0 0 −j 0 0 0 −1 0 0 0 +1 0 0 0 −1 0 0 0 +j 0 0 0 +1 0 0 0 +1 0<br>0 0 +j 0 0 0 −1 0 0 0 +j 0 0 0 +j 0 0 0 +1 0 0 0 −1 0 0 0 +1 0 0 0 +j 0<br>0 0 +1 0 0 0 +1 0 0 0 +j 0 0 0 −1 0 0 0 −j 0 0 0 −j 0 0 0 −1 0 0 0 +1 0<br>0 0 −1 0 0 0 +j 0 0 0 +1 0 0 0 +1 0 0 0 +j 0 0 0 −1 0 0 0 −j 0 0 0 −j 0<br>0 0 −1 0 0 0 +1 0 0 0 −1 0 0 0 −j 0 0 0 −1 0 0 0 −1 0 0 0 −j 0 0 0 +1 0<br>0 0 +1 0 0 0 +1 0 0 0 −j 0 0 0 +j 0 0 0 −j 0 0 0 −1 0 0 0 +j 0 0 0 +j 0<br>0 0 −1 0 0 0 −j 0 0 0 −1 0 0 0 −1 0 0 0 +j 0 0 0 −j 0 0 0 +j 0 0 0 −1 0<br>0 0 +j 0 0 0 +j 0 0 0 −1 0 0 0 −j 0 0 0 +1 0 0 0 +1 0 0 0 −j 0 0 0 +j 0<br>0 0 −j 0 0 0 −1 0 0 0 +j 0 0 0 +j 0 0 0 −1 0 0 0 −j 0 0 0 +1 0 0 0 +1 0<br>0 0 −j 0 0 0 +j 0 0 0 −j 0 0 0 +1 0 0 0 −j 0 0 0 −j 0 0 0 +1 0 0 0 +j 0<br>0 0 +j 0 0 0 +j 0 0 0 +1 0 0 0 −1 0 0 0 +1 0 0 0 −j 0 0 0 −1 0 0 0 −1 0<br>0 0 −j 0 0 0 +1 0 0 0 −j 0 0 0 −j 0 0 0 −1 0 0 0 +1 0 0 0 −1 0 0 0 −j 0<br>0 0 −1 0 0 0 −1 0 0 0 −j 0 0 0 +1 0 0 0 +j 0 0 0 +j 0 0 0 +1 0 0 0 −1 0<br>0 0 +1 0 0 0 −j 0 0 0 −1 0 0 0 −1 0 0 0 −j 0 0 0 +1 0 0 0 +j 0 0 0 +j 0<br>0 0 +1 0 0 0 −1 0 0 0 +1 0 0 0 +j 0 0 0 +1 0 0 0 +1 0 0 0 +j 0 0 0 −1 0<br>0 0 0 0 |

The effects of the present disclosure will not be limited only to the effects described above. Accordingly, effects that have not been mentioned above or additional effects of the present application may become apparent to those having ordinary skill in the art from the description presented below.

Technical Effects

By applying the above-described configuration, in case a station according to the present disclosure transmits an OFDM packet through four bonded channels, by configuring an EDMG STF field using the method proposed in the present disclosure, a low Peak to Average Power Ratio (PAPR) may be achieved.

The effects of the present disclosure will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present disclosure and are incorporated in and constitute a part of this application, illustrate embodiments of the disclosure and serve to explain the principle of the disclosure along with the description of the present document.

FIG. 12 to FIG. 17 are diagrams showing Golay sequences that can be applied to the present disclosure.

FIG. 19 is a diagram showing $EDMGS_{left,800}^{i_{STS}}$ and $EDMGS_{right,800}^{i_{STS}}$ in a case where $i_{STS}$ is equal to 1, FIG. 20 is a diagram showing $EDMGS_{left,800}^{i_{STS}}$ and $EDMGS_{right,800}^{i_{STS}}$ in a case where $i_{STS}$ is equal to 2, FIG. 21 is a diagram showing $EDMGS_{left,800}^{i_{STS}}$ and $EDMGS_{right,800}^{i_{STS}}$ in a case where $i_{STS}$ is equal to 3, FIG. 22 is a diagram showing $EDMGS_{left,800}^{i_{STS}}$ and $EDMGS_{right,800}^{i_{STS}}$ in a case where $i_{STS}$ is equal to 4, FIG. 23 is a diagram showing $EDMGS_{left,800}^{i_{STS}}$ and $EDMGS_{right,800}^{i_{STS}}$ in a case where $i_{STS}$ is equal to 5, FIG. 24 is a diagram showing $EDMGS_{left,800}^{i_{STS}}$ and $EDMGS_{right,800}^{i_{STS}}$ in a case where $i_{STS}$ is equal to 6, FIG. 25 is a diagram showing $EDMGS_{left,800}^{i_{STS}}$ and $EDMGS_{right,800}^{i_{STS}}$ in a case where $i_{STS}$ is equal to 7, and FIG. 26 is a diagram showing $EDMGS_{left,800}^{i_{STS}}$ and $EDMGS_{right,800}^{i_{STS}}$ in a case where $i_{STS}$ is equal to 8.

FIG. 27 is a diagram respectively showing $EDMGS_{left,804}^{i_{STS}}$ in a case where $i_{STS}$ is equal to 1 or 2, FIG. 28 is a diagram respectively showing $EDMGS_{left,804}^{i_{STS}}$ in a case where $i_{STS}$ is equal to 3 or 4, FIG. 29 is a diagram respectively showing $EDMGS_{left,804}^{i_{STS}}$ in a case where $i_{STS}$ is equal to 5 or 6, and FIG. 30 is a diagram respectively showing $EDMGS_{left,804}^{i_{STS}}$ in a case where $i_{STS}$ is equal to 7 or 8.

FIG. 31 is a diagram respectively showing $EDMGS_{rightt,804}^{i_{STS}}$ in a case where $i_{STS}$ is equal to 1 or 2, FIG. 32 is a diagram respectively showing $EDMGS_{rightt,804}^{i_{STS}}$ in a case where $i_{STS}$ is equal to 3 or 4, FIG. 33 is a diagram respectively showing $EDMGS_{rightt,804}^{i_{STS}}$ in a case where $i_{STS}$ is equal to 5 or 6, and FIG. 34 is a diagram respectively showing $EDMGS_{rightt,804}^{i_{STS}}$ in a case where $i_{STS}$ is equal to 7 or 8.

DESCRIPTION OF EXEMPLARY EMBODIMENTS

Hereinafter, the preferred embodiment of the present disclosure will be described in detail with reference to the appended drawings. The detailed description that will hereinafter be disclosed along with the appended drawings will only be provided to describe an exemplary embodiment of the present disclosure. And, therefore, it should be understood that the exemplary embodiment presented herein will not represent the only embodiment for carrying out the present disclosure.

The following detailed description includes specific details for providing a full understanding of the present disclosure. However, it will be apparent to anyone skilled in the art that the present disclosure can be carried out without referring to the above-mentioned specific details. In some cases, in order to avoid any ambiguity in the concept of the present disclosure, the disclosed structure and device may be omitted, or the disclosed structure and device may be illustrated as a block diagram based on their core functions.

Although diverse mobile communication systems applying the present disclosure may exist, a wireless LAN (WLAN) system will hereinafter be described in detail as an example of such mobile communication system.

1. Wireless LAN (WLAN) System

1-1. General Wireless LAN (WLAN) System

Figure 1:
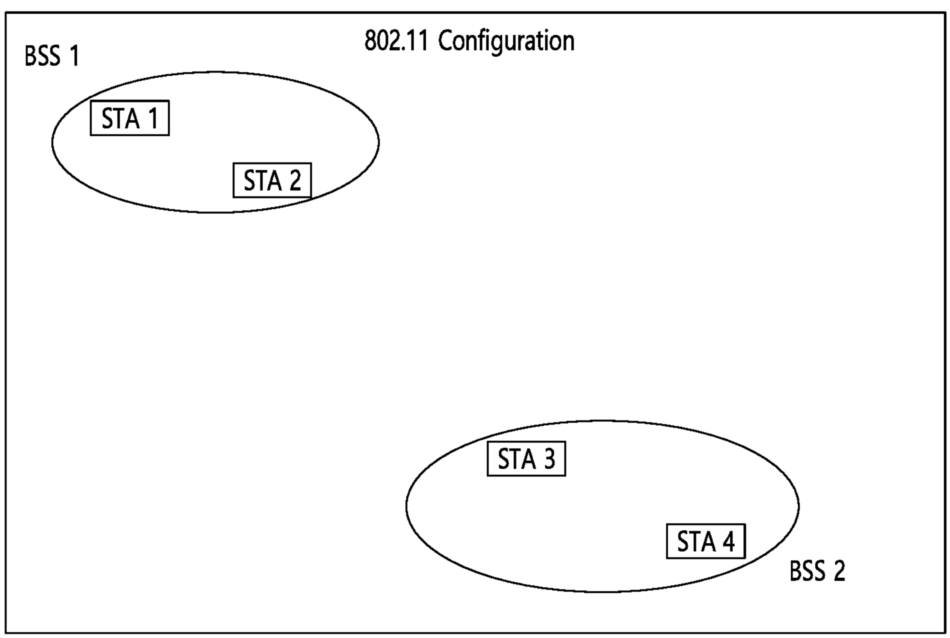
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
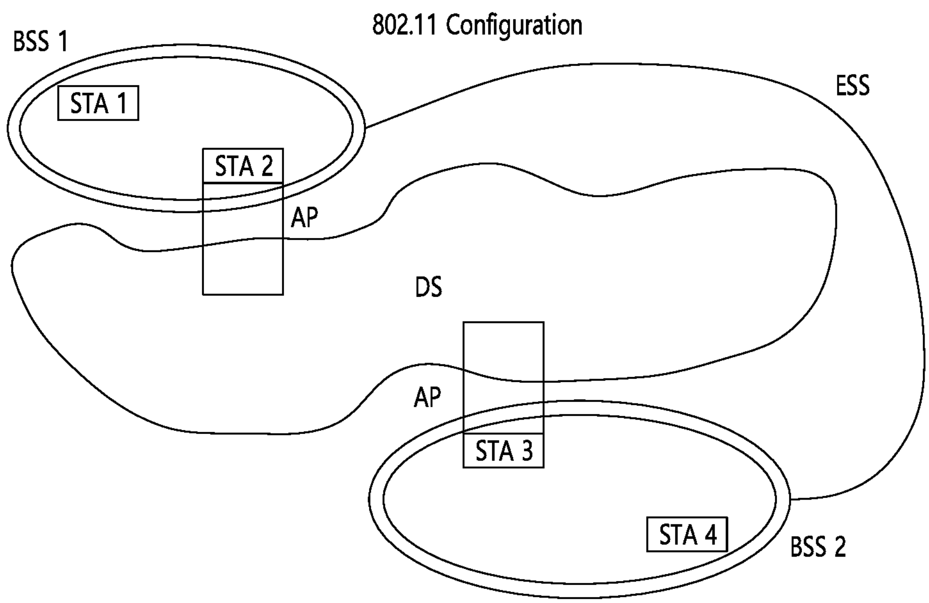
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
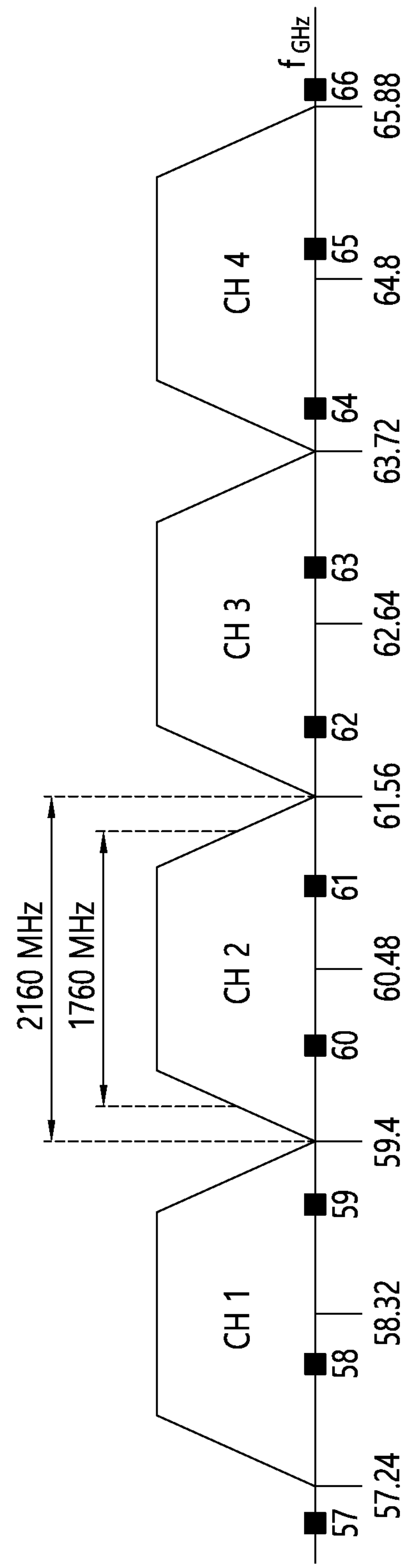
FIG. 3 is a diagram describing a channel in a 60 GHz band for describing a channel bonding operation according to an exemplary embodiment of the present disclosure.

FIG. 3 is a diagram describing a channel in a 60 GHz band for describing a channel bonding operation according to an exemplary embodiment of the present disclosure.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present disclosure will not be limited to only one or more specific channels.

Figure 4:
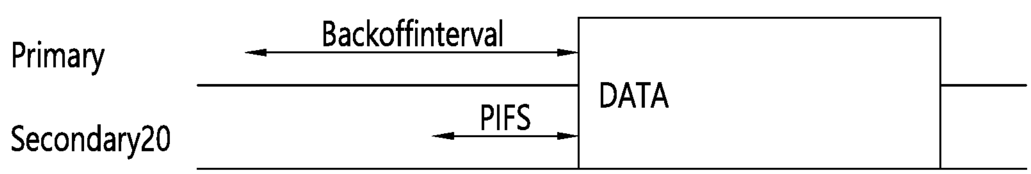
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present disclosure, a solution (or method) for performing scheduling-based access by having the AP transmit scheduling information to the STAs is proposed. Meanwhile, in another aspect of the present disclosure, a solution (or method) for performing contention-based channel access based on the above-described scheduling or independently from the above-described scheduling is proposed. Furthermore, in yet another aspect of the present disclosure, a method for performing communication through a spatial sharing technique based on beamforming is proposed.

1-3. Beacon Interval Configuration

Figure 5:
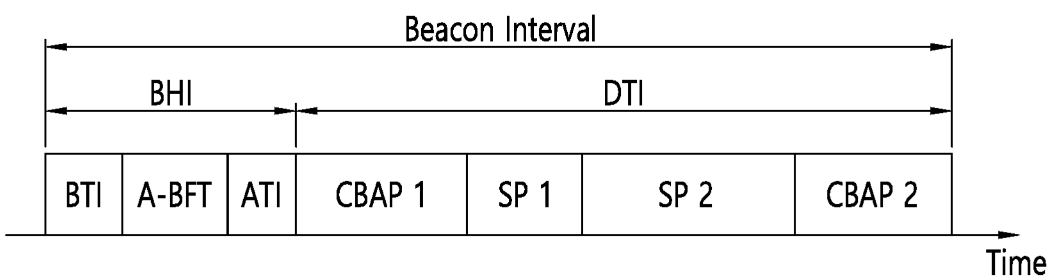
FIG. 5 is a diagram describing a configuration of a beacon interval.

FIG. 5 is a diagram describing a configuration of a beacon interval.

In an 11 ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present disclosure is not necessarily required to be limited only to this.

Hereinafter, a physical layer configuration in a wireless LAN (WLAN) system, in which the present disclosure is to be applied, will be described in detail.

1-4. Physical Layer Configuration

It will be assumed that the wireless LAN (WLAN) system according to an exemplary embodiment of the present disclosure may provide 3 different modulations mode as shown below.

TABLE 1

| PHY | MCS | Note |
|---|---|---|
| Control PHY | 0 | |
| Single carrier PHY | 1, . . . , 12 | (low power |
| (SC PHY) | 25, . . . , 31 | SC PHY) |
| OFDM PHY | 13, . . . , 24 | |

Such modulation modes may be used for satisfying different requirements (e.g., high throughput or stability). Depending upon the system, among the modulation modes presented above, only some of the modulation modes may be supported.

Figure 6:
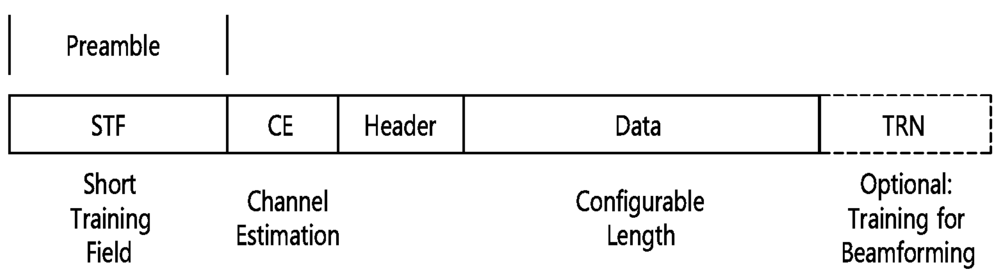
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
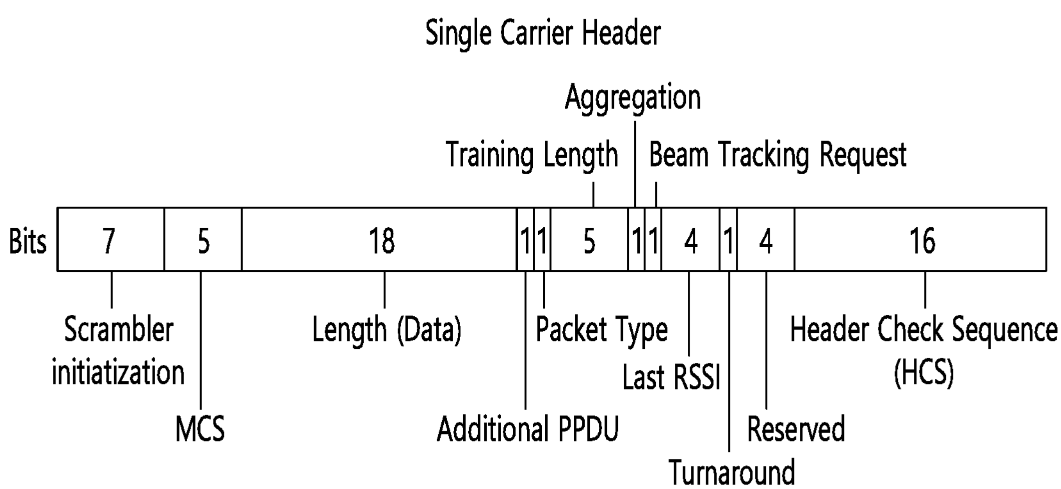
FIG. 7 and FIG. 8 are diagrams describing a configuration of a header field of the radio frame shown in FIG. 6.
Figure 8:
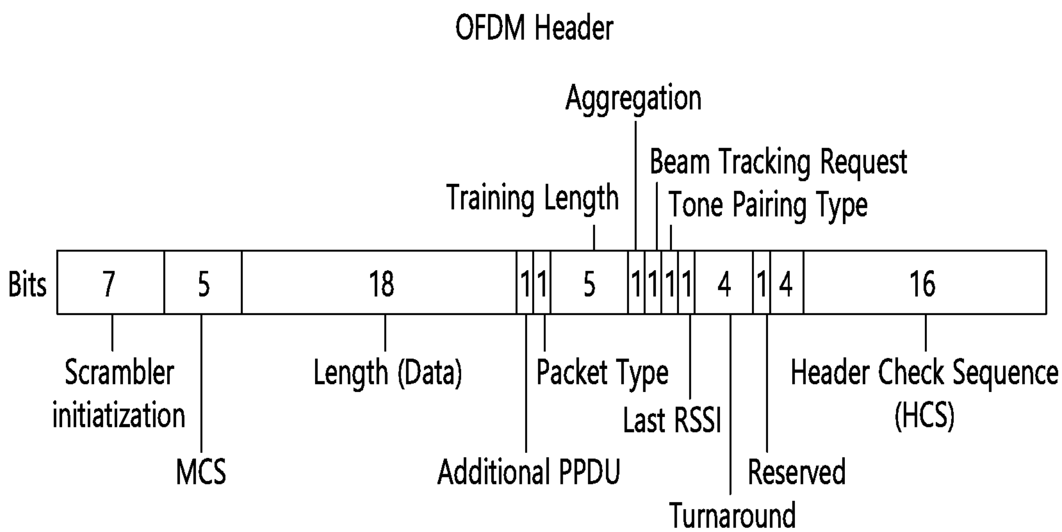

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

Figure 9:
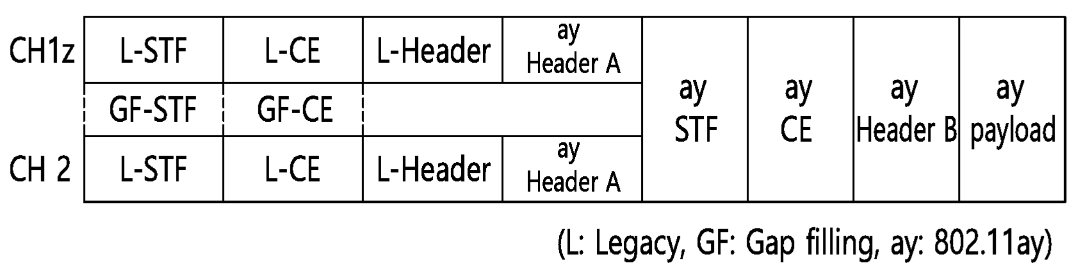
FIG. 9 is a diagram showing a PPDU structure that can be applied to the present disclosure.

FIG. 9 is a diagram showing a PPDU structure according to a preferred embodiment of the present disclosure. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present disclosure, it may be considered to perform the transmission (gap filling) of a new STF and CE field along with the legacy preamble at the same time through the 400 MHz band between each channel.

In this case, as shown in FIG. 9, the PPDU structure according to the present disclosure has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
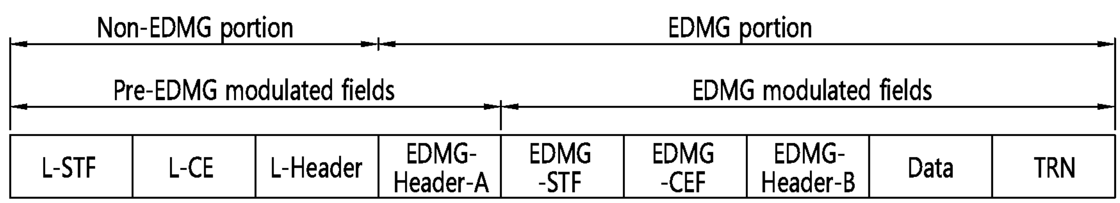
FIG. 10 is a diagram showing a simple PPDU structure that can be applied to the present disclosure.

FIG. 10 is a diagram showing a simple PPDU structure that can be applied to the present disclosure. When briefly summarizing the above-described PPDU format, the PPDU format may be illustrated as shown in FIG. 10.

As shown in FIG. 10, the PPDU format that is applicable to the 11ay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the above-described PPDU may be used for packet detection, Automatic Gain Control (AGC), frequency offset estimation, synchronization, indication of modulation (SC or OFDM), and channel estimation. A format of the preamble may be common to both OFDM packets and SC packets. Herein, the preamble may be configured of a Short Training Field (STF) and a Channel Estimation (CE) field that is positioned after the STF field.

Figure 11:
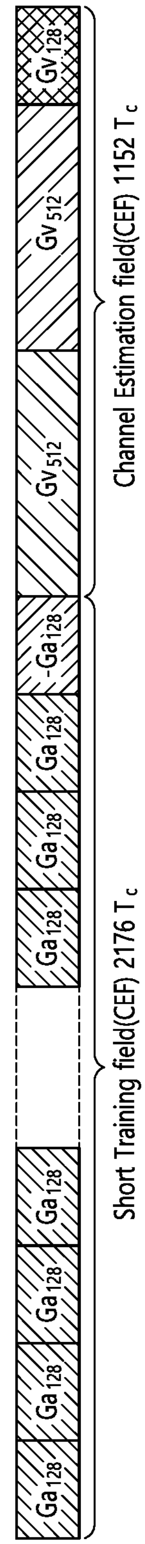
FIG. 11 is a diagram showing a packet preamble that is included in a (legacy) preamble according to the present disclosure.

FIG. 11 is a diagram showing a packet preamble that is included in a (legacy) preamble according to the present disclosure.

The STF is configured of 16 repetitions of $Ga_{128}(n)$ sequences having the length of 128 followed by a single $-Ga_{128}(n)$ sequence. Herein, the waveform for the STF may be expressed as shown in the following equation.

[Equation 1]

$$r_{STF}(nT_c) = \begin{cases} (Ga_{128}(n \bmod 128))\exp\left(j\pi\frac{n}{2}\right) & n = 0, 1, \ldots, 16\times 128-1 \\ (-Ga_{128}(n \bmod 128))\exp\left(j\pi\frac{n}{2}\right) & n = 16, 128, \ldots, 17\times 128-1 \end{cases}$$

The Golay sequences (e.g., $Ga_{128}(n)$, $Gb_{128}(n)$, $Ga_{64}(n)$, $Gb_{64}(n)$, $Ga_{32}(n)$, $Gb_{32}(b)$) are used in the preamble, a single carrier guard interval, and beam refinement TRN-R/T and AGC fields. The Golay sequences may be referred to as complementary sequences. The subscript indicates the length of the sequences. The sequences are generated by using the following recursive procedure.

$$A_0(n)=\delta(n)$$

$$B_0(n)=\delta(n)$$

$$A_k(n)=W_kA_{k-1}(n)+B_{k-1}(n-D_k)$$

$$B_k(n)=W_kA_{k-1}(n)-B_{k-1}(n-D_k) \quad \text{[Equation 2]}$$

Herein, in case $n<0$ or $n\geq 2^k$, $A_k(n)$ and $B_k(n)$ may each be given the value of 0.

In the above-described procedure, in case $D_k=[1\ 8\ 2\ 4\ 16\ 32\ 64]$ ($k=1, 2, \ldots, 7$) and $W_k=[-1\ -1\ -1\ -1\ +1\ -1\ -1]$ are used, values may be given as $Ga_{128}(n)=A_7(128-n)$ and $Gb_{128}(n)=B_7(128-n)$.

Alternatively, in the above-described procedure, in case $D_k=[2\ 1\ 4\ 8\ 16\ 32]$ and $W_k=[1\ 1\ -1\ -1\ 1\ -1]$ are used, values may be given as $Ga_{64}(n)=A_6(64-n)$ and $Gb_{64}(n)=B_6(64-n)$.

Alternatively, in the above-described procedure, in case $D_k=[1\ 4\ 8\ 2\ 16]$ and $W_k=[-1\ 1\ -1\ 1\ -1]$ are used, values may be given as $Ga_{32}(n)=A_5(32-n)$ and $Gb_{32}(n)=B_5(32-n)$.

Each of the above-described sequences may be indicated as shown in FIG. 12 to FIG. 17. Herein, the sequences are normative, the description presented above is informative.

Hereinafter, FIG. 12 to FIG. 17 are diagrams showing Golay sequences that can be applied to the present disclosure.

3. Exemplary Embodiment that is Applicable to the Present Disclosure

The PPDU format shown in FIG. 10 may be applied as the PPDU format of the 11ay system that is applicable to the present disclosure. Herein, an AGC field may be additionally included in a section that is positioned between the Data field and the TRN field.

At this point, each field may be defined as shown below.

TABLE 2

| Field | Description |
|---|---|
| L-STF | Non-EDMG Short Training field |
| L-CEF | Non-EDMG Channel Estimation field |
| L-Header | Non-EDMG Header field |
| EDMG-Header-A | EDMG Header A field |
| EDMG-STF | EDMG Short Training field |
| EDMG-CEF | EDMG CHannel Estimation field |
| EDMG-Header-B | EDMG Header B field |
| Data | The Data field carriers the PSDU(s) |
| AGC | Automatic Gain Control field |
| TRN | Training sequences field |

In case the STA according to the present disclosure is operated in accordance with a Single Input Single Output (SISO) scheme that uses a single channel, the EDMG-STF and EDMG-CEF of Table 2 may not be transmitted.

Hereinafter, a method of designing an EDMG-STF for an OFDM packet (or for an OFDM transmission mode) is proposed based on the above-described technical configurations. More specifically, the present disclosure proposes a method of designing an EDMG-STF for an OFDM packet while considering the following reference details. Hereinafter, the reference details that are being considered in the present disclosure will be described in detail.

(1) Frequency/Time Domain Sequence

The EDMG-STF for an OFDM packet may be transmitted by being configured of a sequence that is generated in the time domain. For example, the EDMG-STF for an OFDM packet may be defined as a DMG-STF that is defined in the 11ad system, or as a new Golay sequence, or as an EDMG-STF for a single carrier (SC) that is defined in the 11ay system.

As a method for matching the sequence defined in the above-described methods with a bandwidth that is occupied by the OFDM packet, a resampling method that is used in the 11ad system may be amended and used, or a new sampling rate may be defined and used. However, the implementation of such configuration may cause a considerable burden.

Accordingly, the present disclosure proposes a method that allows the EDMG-STF to be compatible with an EDMG-CEF by generating a sequence that corresponds to the EDMG-STS in the frequency domain. Thus, by also allowing the bandwidths for the payloads to match one another, a more accurate AGC may be performed as compared to the STA.

Figure 18:
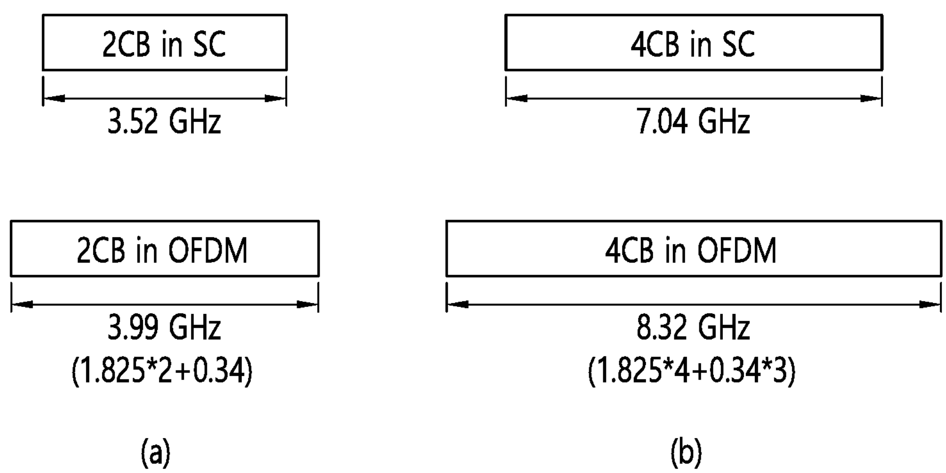
FIG. 18 is a diagram respectively showing bandwidths of an SC packet and an OFDM packet in case of a 2-channel bonding and a 4-channel bonding.

FIG. 18 is a diagram respectively showing bandwidths of an SC packet and an OFDM packet in case of a 2-channel bonding and a 4-channel bonding.

As shown in FIG. 18, in case multiple channels are bonded, a difference between the bandwidth of the SC packet and the bandwidth OFDM packet may be equal to 0.47 GHz (e.g., in case of 2 CB, see (a) of FIG. 18) or 1.28 GHz (e.g., in case of 4 CB, see (b) of FIG. 18) in accordance with the number of bonded channels. Accordingly, a situation where the STA cannot perform an accurate AGC may occur. As described above, the occurrence of such situation increases in accordance with an increase in the number of bonded channels.

(2) Processing Time for L-Header Decoding

The EDMG-STF for the SC packet is designed to have 18 $Ga_{128}*N_{CB}$ sequences and $1-Ga_{128}*N_{CB}$ sequence considering the processing time of the DMG header. At this point, the time occupied by the total of 18+1 sequences is equal to approximately 1.3818 us. Herein, $N_{CB}$ indicates a number of channels being used for channel bonding by using a channel bonding factor.

As described above, the EDMG-STF for the OFDM packet that is proposed in the present disclosure may also be designed while considering the processing time of the DMG header. At this point, when it is assumed that the length ($T_{DFT}+T_{GI}$) of one OFDM symbol is equal to 0.2424 us, 6 or more OFDM symbols may be needed for the decoding of the legacy header. This is because 1.3818 us/0.2424 us=5.7. Thus, the configuration of an EDMG-STF by using 6 OFDM symbols is proposed in the present disclosure.

(3) Compatible Structure to EDMG-STF for SC

As described above, the EDMG-STF for the SC may have a structure of being repeated 4 times within a single carrier block by using Ga128 (in case $N_{CB}=1$). Herein, the structure that is repeated as described above and the number of such structure may influence the AGC and the synchronization performance. Accordingly, the OFDM-specific EDMG-STF may also have a structure of being repeated 4 times during one DFT/IDFT period so as to have similar performance requirement values as the SC.

Herein, the structure of having a specific sequence being repeated 4 times during one DFT/IDFT period is advantageous in that, when considering that a Cyclic Prefix (CP) length of the 11ad system is configured of $T_{DFT}/4$, the corresponding structure has a uniform structure wherein a specific sequence is repeated 5 times during one OFDM symbol period.

As described above, in order to allow a specific sequence to be repeated 4 times within the time domain during the DFT/IDFT period, the EDMG-STF for the OFDM according to the present disclosure may have a structure of having 3 zeros (0s) being repeatedly inserted within the frequency domain.

(4) Hardware (HW) Complexity

As a solution for reducing hardware (HW) complexity, a value other than 0 being included in the EDMG-STF sequence, which is proposed in the present disclosure, may be given a value corresponding to any one of +1, −1, +j, and −j.

(5) Orthogonality for MIMO Support

In order to support MIMO transmission, the sequences for each of the spatial streams according to the present disclosure may be designed to be mutually orthogonal (or orthogonal to one another).

(6) Peak to Average Power Ratio (PAPR) Performance

In order to achieve highly reliable signal transmission and reception, the sequences according to the present disclosure may be designed to minimize PAPR. Most particularly, the EDMG-STF according to the present disclosure may be designed to have a similar PAPR as the PAPR (e.g., 3.12 dB) of the DMG-CEF of the 11ad system.

Hereinafter, a sequence that is applicable to a case where one or two channels are bonded based upon the above-described reference details and a method for generating the corresponding sequence will be described in detail.

Herein, the EDMG-STF according to the present disclosure has a fixed time size (or length) (e.g., 6 OFDM symbol periods). At this point, the fixed time size may be configured independently from the number of space-time sequences.

The structure of the EDMG-STF field according to the present disclosure may be determined based on a number of consecutive channels (e.g., 2.16 GHz channel) being transmitted and an index of a space-time stream.

Hereinafter, a sequence that is applicable to a case where four channels are bonded based upon the above-described reference details and a method for generating the corresponding sequence will be described in detail.

In order to perform an EDMG OFDM transmission through a channel configured of 4 bonded channels (e.g., 8.64 GHz), a frequency sequence (or frequency domain signal), which is used for configuring the EDMG STF field for the $i_{STS^{th}}$ space-time stream, may be expressed as shown below in the following equation.

$$EDMG\text{-}STS_{-805,805}^{i_{STS}}=\{0,0.0.0,EDMGS_{left,800}^{i_{STS}},0,0,0,EDMGS_{rightt,800}^{i_{STS}},0,0,0,0\} \quad \text{[Equation 3]}$$

where "$i_{STS}$" is the space-time stream number and $1 \geq i_{STS} \geq 8$

At this point, $EDMGS_{left,800}^{i_{STS}}$ and $EDMGS_{right,800}^{i_{STS}}$ for each space-time stream may be defined as shown in FIG. 19 to FIG. 26. More specifically, FIG. 19 is a diagram showing $EDMGS_{left,800}^{i_{STS}}$ and $EDMGS_{right,800}^{i_{STS}}$ in a case where $i_{STS}$ is equal to 1, FIG. 20 is a diagram showing and $EDMGS_{left,800}^{i_{STS}}$ and $EDMGS_{right,800}^{i_{STS}}$ in a case where $i_{STS}$ is equal to 2, FIG. 21 is a diagram showing $EDMGS_{left,800}^{i_{STS}}$ and $EDMGS_{right,800}^{i_{STS}}$ in a case where $i_{STS}$ is equal to 3, FIG. 22 is a diagram showing $EDMGS_{left,800}^{i_{STS}}$ and $EDMGS_{right,800}^{i_{STS}}$ in a case where $i_{STS}$ is equal to 4, FIG. 23 is a diagram showing and $EDMGS_{left,800}^{i_{STS}}$ and $EDMGS_{right,800}^{i_{STS}}$ in a case where $i_{STS}$ is equal to 5, FIG. 24 is a diagram showing $EDMGS_{left,800}^{i_{STS}}$ and $EDMGS_{right,800}^{i_{STS}}$ in a case where $i_{STS}$ is equal to 6, FIG. 25 is a diagram showing $EDMGS_{left,800}^{i_{STS}}$ and $EDMGS_{right,800}^{i_{STS}}$ in a case where $i_{STS}$ is equal to 7, and FIG. 26 is a diagram showing $EDMGS_{left,800}^{i_{STS}}$ and $EDMGS_{right,800}^{i_{STS}}$ in a case where $i_{STS}$ is equal to 8.

As a more simplified version of Equation 3 and each sequence shown in FIG. 19 to FIG. 26, sequences for each space-time stream may be expressed as shown below.

$$EDMG\text{-}STF_{-805,805}^{i_{STS}}=\{EDMGS_{left,804}^{i_{STS}},0,0,0,EDMGS_{rightt,804}^{i_{STS}}\} \quad \text{[Equation 4]}$$

where:

$i_{STS}$ is the space-time stream number and $1 \geq i_{STS} \geq 8$

At this point, the $EDMGS_{left,804}^{i_{STS}}$ and $EDMGS_{rightt,804}^{i_{STS}}$ for each space-time stream may be respectively defined as $\{0, 0, 0, 0, EDMGS_{left,800}^{i_{STS}}\}$ and $\{EDMGS_{right,800}^{i_{STS}}, 0, 0, 0, 0\}$ of Equation 3. Accordingly, the $EDMGS_{left,804}^{i_{STS}}$ and $EDMGS_{rightt,804}^{i_{STS}}$ for each space-time stream may be defined as shown in FIG. 27 to FIG. 34. More specifically, FIG. 27 is a diagram respectively showing $EDMGS_{left,804}^{i_{STS}}$ in a case where $i_{STS}$ is equal to 1 or 2, FIG. 28 is a diagram respectively showing $EDMGS_{left,804}^{i_{STS}}$ in a case where $i_{STS}$ is equal to 3 or 4, FIG. 29 is a diagram respectively showing $EDMGS_{left,804}^{i_{STS}}$ in a case where $i_{STS}$ is equal to 5 or 6, and FIG. 30 is a diagram respectively showing $EDMGS_{left,804}^{i_{STS}}$ in a case where $i_{STS}$ is equal to 7 or 8. FIG. 31 is a diagram respectively showing $EDMGS_{rightt,804}^{i_{STS}}$ in a case where $i_{STS}$ is equal to 1 or 2, FIG. 32 is a diagram respectively showing a $EDMGS_{rightt,804}^{i_{STS}}$ in a case where $i_{STS}$ is equal to 3 or 4, FIG. 33 is a diagram respectively showing $EDMGS_{rightt,804}^{i_{STS}}$ in a case where $i_{STS}$ is equal to 5 or 6, and FIG. 34 is a diagram respectively showing $EDMGS_{rightt,804}^{i_{STS}}$ in a case where $i_{STS}$ is equal to 7 or 8.

Referring to the above-described equations, $i_{STS}$ may indicate a spatial stream index, and a subscript may indicate the length of each sequence. Additionally, the three zero (0) values that are positioned in the middle part of the equation presented above may denote a null carrier for a Direct Current (DC) offset removal.

Meanwhile, as a solution for preventing unintentional beamforming, which occurs in a case where the same signal is transmitted from each stream when performing MIMO transmission, the sequences for each spatial stream that are proposed in the present disclosure may be designed to be mutually orthogonal.

Hereinafter, as an example that is applicable to the present disclosure, an example for generating the above-described sequences will be described in detail. In other words, in order to generate the above-described sequence, the STA according to the present disclosure may use a sequence generating method, which will be described later on, or use sequence information (or table information) stored in a separate storage device, or use other diverse methods.

Therefore, in order to generate an EDMG-STF field, the STA according to the present disclosure may use the detailed sequences that are described above. However, in this case, the STA according to the present disclosure may not necessarily use only the following method but may also use other methods so as to generate and use the above-described sequences.

For example, the $EDMGS_{left,800}^{i_{STS}}$ and $EDMGS_{right,800}^{i_{STS}}$ for each spatial stream, which are defined as described above in Equation 3 and FIG. 19 to FIG. 26, may be drawn in accordance with the following procedure.

Firstly, the $EDMGS_{left,800}^{i_{STS}}$ and $EDMGS_{right,800}^{i_{STS}}$ may be defined as shown below in the following equation. At this point, $EDMGS_{left,800}^{i_{STS}}(n)$ may refer to an $n^{th}$ value of $EDMGS_{left,800}^{i_{STS}}$, and $EDMGS_{right,800}^{i_{STS}}(n)$ may refer to an $n^{th}$ value of $EDMGS_{right,800}^{i_{STS}}$.

$$EDMGS_{left,800}^{i_{STS}}(n) = \begin{cases} subSeq_{left,200}^{i_{STS}}(\lfloor n/4 \rfloor), & n\bmod 4 = 1 \\ 0, & n\bmod 4 \neq 1 \end{cases}$$

$$EDMGS_{right,800}^{i_{STS}}(n) = \begin{cases} subSeq_{right,200}^{i_{STS}}(\lfloor n/4 \rfloor), & n\bmod 4 = 2 \\ 0, & n\bmod 4 \neq 2 \end{cases} \quad \text{[Equation 5]}$$

Referring to Equation 5, $subSeq_{left,200}^{i_{STS}}$ and $subSeq_{right,200}^{i_{STS}}$ may be defined as shown below in the following equation.

$$subSeq_{left,200}^{i_{STS}}(n)=[jA_3^{i_{STS}}, jA_3^{i_{STS}}, A_3^{i_{STS}}, -A_3^{i_{STS}}, A_3^{i_{STS}}]$$

$$subSeq_{right,200}^{i_{STS}}(n)=[jB_3^{i_{STS}}, B_3^{i_{STS}}, B_3^{i_{STS}}, jB_3^{i_{STS}}, -B_3^{i_{STS}}] \quad \text{[Equation 6]}$$

Referring to Equation 6, $A_3^{i_{STS}}$ and $B_3^{i_{STS}}$ may be generated through a recursive procedure, which is shown below in the following equation.

$$A_0^{i_{STS}}(n)=[+j,+j,+1,-1,+1],\ \text{for } i_{STS}=1,2,\ldots,8$$

$$B_0^{i_{STS}}(n)=[+j,+1,+1,+j,-1],\ \text{for } i_{STS}=1,2,\ldots,8$$

$$A_k^{i_{STS}}(n)=[W_k^{i_{STS}}A_{k-1}^{i_{STS}}(n), B_{k-1}^{i_{STS}}(n)]$$

$$B_k^{i_{STS}}(n)=[W_k^{i_{STS}}A_{k-1}^{i_{STS}}(n), B_{k-1}^{i_{STS}}(n)] \quad \text{[Equation 7]}$$

Herein, k indicates an iteration index, and $W_k^{i_{STS}}$ indicates the weight for a sequence of the $i_{STS}^{th}$ space-time stream and a $k^{th}$ iteration.

A $W_k^{i_{STS}}$ vector for each space-time stream may be expressed as shown below in Table 3.

TABLE 3

| Space-time stream number | $W_k^{i_{STS}}$ |
|---|---|
| 1 | [+1, +1, +1] |
| 2 | [+1, +1, −1] |
| 3 | [+1, −1, +1] |
| 4 | [+1, −1, −1] |
| 5 | [−1, +1, +1] |
| 6 | [−1, +1, −1] |
| 7 | [−1, −1, +1] |
| 8 | [−1, −1, −1] |

Additionally, in Equation 7, $A_0^{i_{STS}}(n)=[-j,-j,-1,+1,-1]$ may be applied instead of $A_0^{i_{STS}}(n)=[+j,+j,+1,-1,+1]$, or $B_0^{i_{STS}}(n)=[-j,-1,-1,-j,+1]$ may be applied instead of $B_0^{i_{STS}}(n)=[+j,+1,+1,+j,-1]$.

Alternatively, referring to Equation 7, element values corresponding to an inverse order of the elements shown in Equation 7 may be applied to $A_0^{i_{STS}}$ and $B_0^{i_{STS}}$. Accordingly, this may be expressed as $A_0^{i_{STS}}(n)=[+1,-1,+1,+j,+j]$ and $B_0^{i_{STS}}(n)=[-1,+j,+1,+1,+j]$.

Meanwhile, elements satisfying mutual orthogonality may be applied as the $W_k^{i_{STS}}$ vector for each space-time stream. For example, unlike Table 4, complex numbers including imaginary numbers may also be applied as the elements configuring the $W_k^{i_{STS}}$ vector for each space-time stream.

In case of configuring the $W_k^{i_{STS}}$ vector for each space-time stream as shown in the table presented above, a PAPR for each space-time stream may be expressed as shown below.

TABLE 4

| Space-Time Stream number | PAPR |
|---|---|
| 1 | 3.00 |
| 2 | 3.00 |
| 3 | 3.01 |
| 4 | 3.00 |
| 5 | 3.00 |
| 6 | 3.00 |
| 7 | 3.00 |
| 8 | 3.00 |

Referring to the above-described configurations, the EDMG-STF field transmit (or transmission) waveform in the time domain may be defined as shown below, in a case where the OFDM sampling rate corresponds to $F_s=N_{CB}$*2.64 GHz and where the time period (or duration) corresponds to $T_s=1/F_s$ ns.

$$r_{EDMG\text{-}STF}^{i_{TX}}(qT_s) = \frac{1}{\sqrt{N_{STS}\cdot N_{EDMG\text{-}STF}^{Tone}}} w(qT_s)\cdot \sum_{k=-N_{SR}}^{N_{SR}} \sum_{i_{STS}=1}^{N_{STS}} [Q_k]_{i_{TX},i_{STS}} EDMG-STF_k^{i_{STS}} \exp(j2\pi k\Delta_F(qT_s)) \quad \text{[Equation 8]}$$

Herein, in case $N_{CB}$=1, 2, 3, and 4, the $N_{EDMG\text{-}STF}^{Tone}$ is respectively equal to 88, 192, 296, and 400, and $Q_k$ indicates a $k^{th}$ spatial mapping matrix per subcarrier, and $[\ ]_{m,n}$ indicates a matrix element of an $m^{th}$ row and an $n^{th}$ column. $w(qT_s)$ indicates a window function that is applied in order to mitigate (or smooth) the transitions between consecutive OFDM symbols. And, herein, the definition of the $w(qT_s)$ may be implementation dependent.

Figure 35:
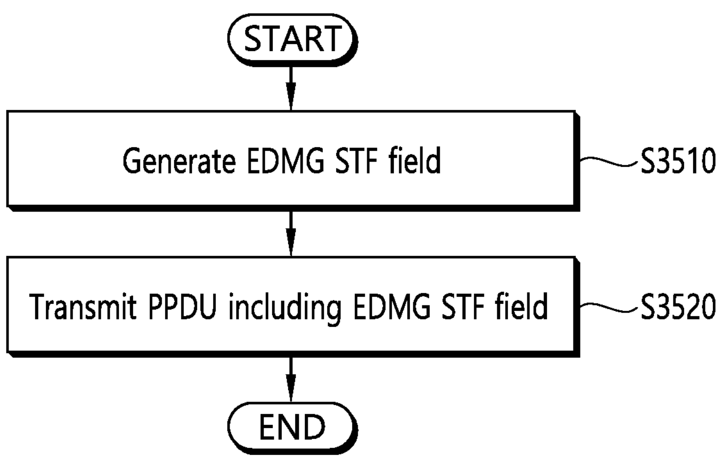
FIG. 35 is a flow chart showing a signal transmission method according to an exemplary embodiment of the present disclosure.

FIG. 35 is a flow chart showing a signal transmission method according to an exemplary embodiment of the present disclosure.

Firstly, a station (STA) according to the present disclosure generates an EDMG STF field, which is being transmitted in an OFDM mode (or transmitted for an OFDM packet) based on a number of channels (e.g., 4), which are included in a bonded channel through which an EDMG PPDU is transmitted, and an index of a space-time stream (S3510).

At this point, an EDMG STF sequence for each space-time stream being included in the EDMG STF field may be configured to have a format of {A, 0, 0, 0, B}, and A and B may be configured of 804-length sequences.

Most particularly, A and B for each space-time stream may be respectively orthogonal to the A and B of another space-time stream. In other words, A (or B) of a first space-time stream may be configured to be mutually orthogonal to A (or B) of a second space-time stream.

At this point, non-zero values that are included in A and B are configured/determined based on values of the first sequence and the second sequence, each having a length of 5 bits or each having 5 non-zero elements, and the first and second sequences are repeatedly positioned/included in A and B with a predetermined weight.

Accordingly, A and B for each space-time stream may be configured as shown in FIG. 19 to FIG. 34.

Herein, the EDMG STF field may be configured to have the length of 6 OFDM symbols.

At this point, a maximum of 8 space-time streams may be configured, and the first sequence ($A_0^{iSTS}(n)$) and the second sequence ($B_0^{iSTS}(n)$) of each space-time stream ($i_{STS}$) may each be configured to have a sequence as shown below in Equation 9.

$$A_0^{iSTS}(n)=[+j,+j,+1,-1,+1],\ \text{for } i_{STS}=1,2,\ldots,8$$

$$B_0^{iSTS}(n)=[+j,+1,+1,+j,-1],\ \text{for } i_{STS}=1,2,\ldots,8 \quad \text{[Equation 9]}$$

Herein, non-zero values that are included in A and B may be configured of sequences of $A_2^{iSTS}(n)$ and $B_2^{iSTS}(n)$, which are respectively determined by Equation 10 shown below.

$$A_k^{iSTS}(n)=[W_k^{iSTS}A_{k-1}^{iSTS}(n),B_{k-1}^{iSTS}(n)]$$

$$B_k^{iSTS}(n)=[W_k^{iSTS}A_{k-1}^{iSTS}(n),-B_{k-1}^{iSTS}(n)] \quad \text{[Equation 10]}$$

The $W_k^{iSTS}$ for each space-time stream shown in Equation 10 may be expressed as shown below in the following table.

TABLE 5

| Space-time stream number | $W_k^{iSTS}$ |
|---|---|
| 1 | [+1, +1, +1] |
| 2 | [+1, +1, −1] |
| 3 | [+1, −1, +1] |
| 4 | [+1, −1, −1] |
| 5 | [−1, +1, +1] |
| 6 | [−1, +1, −1] |
| 7 | [−1, −1, +1] |
| 8 | [−1, −1, −1] |

Herein, A and B of each space-time stream may include a {0, 0, 0} sequence between the non-zero values.

Most particularly, A of each space-time stream may include a {0, 0, 0, 0} sequence, which is positioned in a foremost position, and a {0, 0} sequence, which is positioned in a rearmost position. And, B of each space-time stream may include a {0, 0} sequence, which is positioned in a foremost position, and a {0, 0, 0, 0} sequence, which is positioned in a rearmost position.

Thereafter, the station transmits the EDMG STF field being transmitted in the OFDM mode to another station through a space-time stream within the four bonded channels (S3520).

4. Device Configuration

Figure 36:
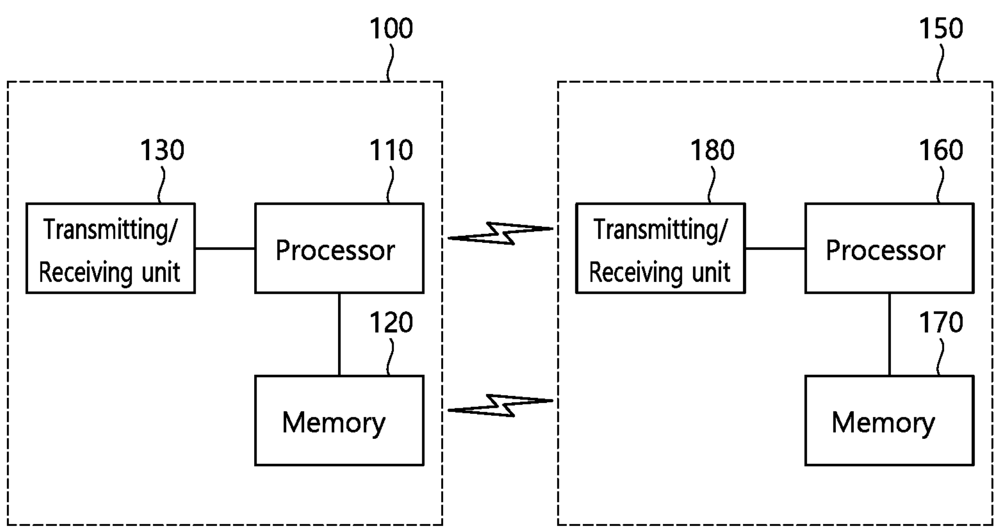
FIG. 36 is a diagram describing a device for implementing the above-described method.

FIG. 36 is a diagram describing a device for implementing the above-described method.

A wireless device (100) of FIG. 36 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present disclosure, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present disclosure is provided so that anyone skilled in the art can implement and execute the present disclosure. In the detailed description presented herein, although the present disclosure is described with reference to the preferred exemplary embodiment of the present disclosure, it will be understood by anyone having ordinary skills in the art that diverse modifications, alterations, and variations can be made in the present disclosure. Therefore, the scope and spirit of the present disclosure will not be limited only to the exemplary embodiments of the present disclosure set forth herein. Thus, it is intended to provide the broadest scope and spirit of the appended claims of the present disclosure that are equivalent to the disclosed principles and novel characteristics of the present disclosure.

INDUSTRIAL APPLICABILITY

Although the present disclosure has been described in detail under the assumption that the present disclosure can be applied to an IEEE 802.11 based wireless LAN (WLAN) system, the present disclosure will not be limited only to this. It will be understood that the present disclosure can be applied to diverse wireless systems capable of performing data transmission based on channel bonding by using the same method as presented herein.

What is claimed is:

1. A method for transmitting, by a first station (STA), a signal in a wireless LAN (WLAN) system, comprising:

generating an Enhanced Directional Multi Gigabit (EDMG) Short Training Field (STF) field based on a number of channels and a space-time stream (STS) index; and transmitting an EDMG Physical Protocol Data Unit (PPDU) including the EDMG STF field in an Orthogonal Frequency Division Multiplexing (OFDM) mode through an STS within 8.64 GHz channel to a second STA, wherein an EDMG STF sequence for each STS is used for the EDMG STF field, wherein the EDMG STF sequence for each STS is configured to have a format of {A, 0, 0, 0, B}, wherein each of A and B is a sequence having a length of 804 bits, wherein A for a first STS is orthogonal to A for a second STS, and B for the first STS is orthogonal to B for the second STS.

2. The method of claim 1, wherein non-zero values included in A and B are configured based on a first sequence and a second sequence, each having a length of 5, and the first sequence and the second sequence are repeatedly included in A and B with a predetermined weight.

3. The method of claim 2, wherein the first sequence and the second sequence are configured based on Equation 31:

$$A_0^{iSTS}(n)=[+j,+j,+1,-1,+1],\ \text{for } i_{STS}=1,2,\ldots,8$$

$$B_0^{iSTS}(n)=[+j,+1,+1,+j,-1],\ \text{for } i_{STS}=1,2,\ldots,8 \qquad \text{[Equation 31]}$$

where $A_0^{iSTS}(n)$ denotes the first sequence, $B_0^{iSTS}(n)$ denotes the second sequence, and $i_{STS}$ denotes each STS and j denotes an imaginary number, wherein the non-zero values included in A and B are configured based on sequences of $A_2^{iSTS}(n)$ and $B_2^{iSTS}(n)$, each being determined by Equation 32 shown below:

$$A_k^{iSTS}(n)=[W_k^{iSTS}A_{k-1}^{iSTS}(n),B_{k-1}^{iSTS}(n)]$$

$$B_k^{iSTS}(n)=[W_k^{iSTS}A_{k-1}^{iSTS}(n),-B_{k-1}^{iSTS}(n)] \qquad \text{[Equation 32]}$$

wherein $W_k^{iSTS}$ for each STS shown in Equation 32 is determined as shown below in Table 31.

TABLE 31

| Space-time stream number | $W_k^{i_{STS}}$ |
|---|---|
| 1 | [+1, +1, +1] |
| 2 | [+1, +1, −1] |
| 3 | [+1, −1, +1] |
| 4 | [+1, −1, −1] |
| 5 | [−1, +1, +1] |
| 6 | [−1, +1, −1] |
| 7 | [−1, −1, +1] |
| 8 | [−1, −1, −1] |

4. The method of claim 3, wherein each of A and B includes a {0, 0, 0} sequence between the non-zero values.

5. The method of claim 4, wherein A includes a {0, 0, 0, 0} sequence being positioned in a foremost position and a {0, 0} sequence being positioned in a rearmost position, and wherein B includes a {0, 0} sequence being positioned in a foremost position and a {0, 0, 0, 0} sequence being positioned in a rearmost position.

6. The method of claim 1, wherein when the STS index is one, A is defined as {0, 0, 0, 0, 0, –1, 0, 0, 0, –1, 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, –1, 0, 0, 0, –1, 0, 0, 0, +j, 0, 0, 0, –j, 0, 0, 0, +j, 0, 0, 0, +1, 0, 0, 0, –j, 0, 0, 0, –j, 0, 0, 0, +1, 0, 0, 0, +j, 0, 0, 0, –1, 0, 0, 0, –1, 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, +1, 0, 0, 0, +1, 0, 0, 0, –j, 0, 0, 0, +j, 0, 0, 0, –j, 0, 0, 0, –1, 0, 0, 0, +j, 0, 0, 0, +j, 0, 0, 0, –1, 0, 0, 0, –j, 0, 0, 0, –1, 0, 0, 0,–1 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, –1, 0, 0, 0, –1, 0, 0, 0, +j, 0, 0, 0, –j, 0, 0, 0, +j, 0, 0, 0, +1, 0, 0, 0, –j, 0, 0, 0, –j, 0, 0, 0, +1, 0, 0, 0, +j, 0, 0, 0, –1, 0, 0, 0, –1, 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, +1, 0, 0, 0, +1, 0, 0, 0, –j, 0, 0, 0, +j, 0, 0, 0, –j, 0, 0, 0, –1, 0, 0, 0, +j, 0, 0, 0, +j, 0, 0, 0, –1, 0, 0, 0, –j, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, –j, 0, 0, 0, –j, 0, 0, 0, –1, 0, 0, 0, +1, 0, 0, 0, –1, 0, 0, 0, +j, 0, 0, 0, +1, 0, 0, 0, +1, 0, 0, 0, +j, 0, 0, 0, –1, 0, 0, 0, –j, 0, 0, 0, –j, 0, 0, 0, –1, 0, 0, 0, +1, 0, 0, 0, –1, 0, 0, 0, –j, 0, 0, 0, –1, 0, 0, 0, –1, 0, 0, 0, –j, 0, 0, 0, +1, 0, 0, 0, –j, 0, 0, 0, –j, 0, 0, 0, –1, 0, 0, 0, +1, 0, 0, 0, –1, 0, 0, 0, +j, 0, 0, 0, +1, 0, 0, 0, +1, 0, 0, 0, +j, 0, 0, 0, –1, 0, 0, 0, –j, 0, 0, 0, –j, 0, 0, 0, –1, 0, 0, 0, +1, 0, 0, 0, –1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, –j, 0, 0, 0, –j, 0, 0, 0, –1, 0, 0, 0, +1, 0, 0, 0, –1, 0, 0, 0, +j, 0, 0, 0, +1, 0, 0, 0, +1, 0, 0, 0, +j, 0, 0, 0, –1, 0, 0}, and wherein when the STS index is one, B is defined as {0, 0, –1, 0, 0, 0, –1, 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, –1, 0, 0, 0, –1, 0, 0, 0, +j, 0, 0, 0, –j, 0, 0, 0, +j, 0, 0, 0, +1, 0, 0, 0, –j, 0, 0, 0, –j, 0, 0, 0, +1, 0, 0, 0, +j, 0, 0, 0, +1, 0, 0, 0, +1, 0, 0, 0, –j, 0, 0, 0, +j, 0, 0, 0, –j, 0, 0, 0, +1, 0, 0, 0, –j, 0, 0, 0, –j, 0, 0, 0, +1, 0, 0, 0, +j, 0, 0, 0, –1, 0, 0, 0, –1, 0, 0, 0, +j, 0, 0, 0, –j, 0, 0, 0, +j, 0, 0, 0, +1, 0, 0, 0, –j, 0, 0, 0, –j, 0, 0, 0, +1, 0, 0, 0, +j, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, –j, 0, 0, 0, –j, 0, 0, 0, –1, 0, 0, 0, +1, 0, 0, 0, –1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, +j, 0, 0, 0, +1, 0, 0, 0, +1, 0, 0, 0, +j, 0, 0, 0, –1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, –j, 0, 0, 0, –j, 0, 0, 0, –1, 0, 0, 0, +1, 0, 0, 0, –1, 0, 0, 0, –j, 0, 0, 0, –1, 0, 0, 0, –1, 0, 0, 0, –j, 0, 0, 0, +1, 0, 0, 0, +j, 0, 0, 0, +j, 0, 0, 0, +1, 0, 0, 0, –1, 0, 0, 0, +1, 0, 0, 0, –j, 0, 0, 0, –1, 0, 0, 0, –1, 0, 0, 0, –j, 0, 0, 0, +1, 0, 0, 0, –1, 0, 0, 0, –1, 0, 0, 0, +j, 0, 0, 0, –j, 0, 0, 0, +j, 0, 0, 0, –1, 0, 0, 0, +j, 0, 0, 0, +j, 0, 0, 0, –1, 0, 0, 0, –j, 0, 0, 0, –1, 0, 0, 0, –1, 0, 0, 0, +j, 0, 0, 0, –j, 0, 0, 0, +j, 0, 0, 0, +1, 0, 0, 0, –j, 0, 0, 0, –j, 0, 0, 0, +1, 0, 0, 0, +j, 0, 0, 0, +1, 0, 0, 0, +1, 0, 0, 0, −j, 0, 0, 0, +j, 0, 0, 0, −j, 0, 0, 0, +1, 0, 0, 0, −j, 0, 0, 0, −j, 0, 0, 0, +1, 0, 0, 0, +j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0,−1 0, 0, 0, −j, 0, 0, 0, +1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, 0, 0}, where j denotes an imaginary number.

7. A method for receiving, by a first station (STA), a signal in a wireless LAN (WLAN) system, comprising:

receiving an Enhanced Directional Multi Gigabit (EDMG) Physical Protocol Data Unit (PPDU) including an EDMG Short Training Field (STF) field being generated based on a number of channels and a space-time stream (STS) index, wherein the EDMG PPDU is transmitted in an Orthogonal Frequency Division Multiplexing (OFDM) mode through an STS within 8.64 GHz channel from a second STA, wherein an EDMG STF sequence for each STS is used for the EDMG STF field, wherein the EDMG STF sequence for each STS is configured to have a format of {A, 0, 0, 0, B}, wherein each of A and B is a sequence having a length of 804 bits, wherein A for a first STS is orthogonal to A for a second STS, and B for the first STS is orthogonal to B for the second STS.

8. The method of claim 7, wherein non-zero values included in A and B are configured based on a first sequence and a second sequence, each having a length of 5, and the first sequence and the second sequence are repeatedly included in A and B with a predetermined weight.

9. The method of claim 8, wherein the first sequence and the second sequence are configured based on Equation 51:

$A_0^{iSTS}(n)=[+j,+j,+1,-1,+1]$, for $i_{STS}=1,2,\ldots,8$ $B_0^{iSTS}(n)=[+j,+1,+1,+j,-1]$, for $i_{STS}=1,2,\ldots,8$ [Equation 51]

where $A_0^{iSTS}(n)$ denotes the first sequence, $B_0^{iSTS}(n)$ denotes the second sequence, and $i_{STS}$ denotes each STS and j denotes an imaginary number, wherein the non-zero values included in A and B are configured based on sequences of $A_2^{iSTS}(n)$ and $B_2^{iSTS}(n)$, each being determined by Equation 32 shown below:

$A_k^{iSTS}(n)=[W_k^{iSTS}A_{k-1}^{iSTS}(n),B_{k-1}^{iSTS}(n)]$ $B_k^{iSTS}(n)=[W_k^{iSTS}A_{k-1}^{iSTS}(n),-B_{k-1}^{iSTS}(n)]$ [Equation 52]

wherein $W_k^{i_{STS}}$ for each STS shown in Equation 52 is determined as shown below in Table 51.

TABLE 51

| Space-time stream number | $W_k^{i_{STS}}$ |
|---|---|
| 1 | [+1, +1, +1] |
| 2 | [+1, +1, −1] |
| 3 | [+1, −1, +1] |
| 4 | [+1, −1, −1] |
| 5 | [−1, +1, +1] |
| 6 | [−1, +1, −1] |
| 7 | [−1, −1, +1] |
| 8 | [−1, −1, −1]. |

10. The method of claim 9, wherein each of A and B includes a {0, 0, 0} sequence between the non-zero values.

11. The method of claim 10, wherein A includes a {0, 0, 0} sequence being positioned in a foremost position and a {0, 0} sequence being positioned in a rearmost position, and wherein B includes a {0, 0} sequence being positioned in a foremost position and a {0, 0, 0, 0} sequence being positioned in a rearmost position.

12. The method of claim 7, wherein when the STS index is one, A is defined as {0, 0, 0, 0, 0, −1, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, −1, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, +1, 0, 0, 0, +1, 0, 0, 0, −j, 0, 0, 0, +j, 0, 0, 0, −j, 0, 0, 0, −1, 0, 0, 0, +j, 0, 0, 0, +j, 0, 0, 0, −1, 0, 0, 0, −j, 0, 0, 0, −1, 0, 0, 0, −1 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, −1, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, +1, 0, 0, 0, +1, 0, 0, 0, −j, 0, 0, 0, +j, 0, 0, 0, −j, 0, 0, 0, −1, 0, 0, 0, +j, 0, 0, 0, +j, 0, 0, 0, −1, 0, 0, 0, −j, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0, −1, 0, 0, 0, −j, 0, 0, 0, +1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0}, and wherein when the STS index is one, B is defined as {0, 0, −1, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, +1, 0, 0, 0, +1, 0, 0, 0, −j, 0, 0, 0, +j, 0, 0, 0, −j, 0, 0, 0, +1, 0, 0, 0, −j, 0, 0, 0, −j, 0, 0, 0, +1, 0, 0, 0, +j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0, −1, 0, 0, 0, −j, 0, 0, 0, +1, 0, 0, 0, +j, 0, 0, 0, +j, 0, 0, 0, +1, 0, 0, 0, −1, 0, 0, 0, +1, 0, 0, 0, −j, 0, 0, 0, −1, 0, 0, 0, −1, 0, 0, 0, −j, 0, 0, 0, +1, 0, 0, 0, −1, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, −1, 0, 0, 0, −j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, +1, 0, 0, 0, +1, 0, 0, 0, −j, 0, 0, 0, +j, 0, 0, 0, −j, 0, 0, 0, +1, 0, 0, 0, −j, 0, 0, 0, −j, 0, 0, 0, +1, 0, 0, 0, +j, 0, 0, 0, −1, 0, 0, 0, −1, 0, 0, 0, +j, 0, 0, 0, −j, 0, 0, 0, +j, 0, 0, 0, +1, 0, 0, 0, −j, 0, 0, 0, −j, 0, 0, 0, +1, 0, 0, 0, +j, 0, 0, 0, −j, 0, 0, 0, −j, 0, 0, 0, −1, 0, 0, 0, +1, 0, 0, 0, −1, 0, 0, 0, −j, 0, 0, 0, −1, 0, 0, 0, −1 0, 0, 0, −j, 0, 0, 0, +1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, +j, 0, 0, 0, +j, 0, 0, 0, +1, 0, 0, 0, −1, 0, 0, 0, +1, 0, 0, 0, +j, 0, 0, 0, +1, 0, 0, 0, +1, 0, 0, 0, +j, 0, 0, 0, −1, 0, 0, 0, −j, 0, 0, 0, −j, 0, 0, 0, −1, 0, 0, 0, +1, 0, 0, 0, −1, 0, 0, 0, +j, 0, 0, 0, +1, 0, 0, 0, +1, 0, 0, 0, +j, 0, 0, 0, −1, 0, 0, 0, 0, 0}, where j denotes an imaginary number.

13. A station device for transmitting a signal in a wireless LAN (WLAN) system, comprising:

a transceiver that transmits or receives a signal to or from another station device; and a processor being operatively connected to the transceiver, wherein the processor is configured to:

generate an Enhanced Directional Multi Gigabit (EDMG) Short Training Field (STF) field based on a number of channels and a space-time stream (STS) index, and transmit an EDMG Physical Protocol Data Unit (PPDU) including the EDMG STF field an Orthogonal Frequency Division Multiplexing (OFDM) mode through an STS within 8.64 GHz channel, wherein an EDMG STF sequence for each STS is used for the EDMG STF field, wherein the EDMG STF sequence for each STS is configured to have a format of {A, 0, 0, 0, B}, wherein each of A and B is a sequence having a length of 804 bits, wherein A for a first STS is orthogonal to A for a second STS, and B for the first STS is orthogonal to B for the second STS.

* * * * *